US008750902B2

(12) United States Patent
Xiao et al.

(10) Patent No.: US 8,750,902 B2
(45) Date of Patent: Jun. 10, 2014

(54) USER PROFILE-BASED ASSISTANCE COMMUNICATION SYSTEM

(75) Inventors: Hong Xiao, Acton, MA (US); Dongchen Wang, Concord, MA (US); Andre R. Turner, Belmont, MA (US); Rahul Khushoo, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 275 days.

(21) Appl. No.: 13/149,346

(22) Filed: May 31, 2011

(65) Prior Publication Data
US 2012/0309424 A1 Dec. 6, 2012

(51) Int. Cl.
*H04W 24/00* (2009.01)
(52) U.S. Cl.
USPC ........................ 455/456.3; 705/7.14; 705/26.7
(58) Field of Classification Search
USPC .......... 455/456.3, 457, 550.1; 705/7.14, 26.7, 705/14.25, 14.1, 14.35, 14.41, 4, 14.54, 705/26.1, 1, 5; 707/E17.014, 100, 769, 706; 707/758; 701/201; 702/188; 704/246, 704/E15.001; 715/753; 434/322, 107, 350; 340/439
See application file for complete search history.

(56) References Cited

U.S. PATENT DOCUMENTS

| 5,544,231 | A  | * | 8/1996  | Cho ........................... 379/88.24 |
| 8,140,358 | B1 | * | 3/2012  | Ling et al. ........................ 705/4 |
| 2008/0132251 | A1 | * | 6/2008  | Altman et al. ................ 455/457 |
| 2009/0082037 | A1 | * | 3/2009  | Ju et al. ...................... 455/456.3 |
| 2009/0311658 | A1 | * | 12/2009 | Polivka .......................... 434/350 |
| 2012/0290434 | A1 | * | 11/2012 | Moritz et al. ................ 705/26.7 |

* cited by examiner

*Primary Examiner* — Charles Appiah
*Assistant Examiner* — Alexander Yi

(57) ABSTRACT

A method including providing a user profile-based assistance service; receiving an assistance request from a subscriber, wherein the assistance request includes geographic information pertaining to a destination of the subscriber; searching a user profiles repository storing user profiles of other subscribers, wherein each user profile includes information indicating a geographic location in which the other subscriber has at least one of lived or worked; selecting candidate user profiles to offer assistance to the subscriber seeking assistance based on a matching between the geographic information pertaining to the destination and a geographic location in which each of the one or more other subscribers at least one of currently lives or works; sending the one or more candidate user profiles to the subscriber; receiving a selection of one of the one or more candidate user profiles; and establishing a communication session between the subscribe and the other selected subscriber.

24 Claims, 15 Drawing Sheets

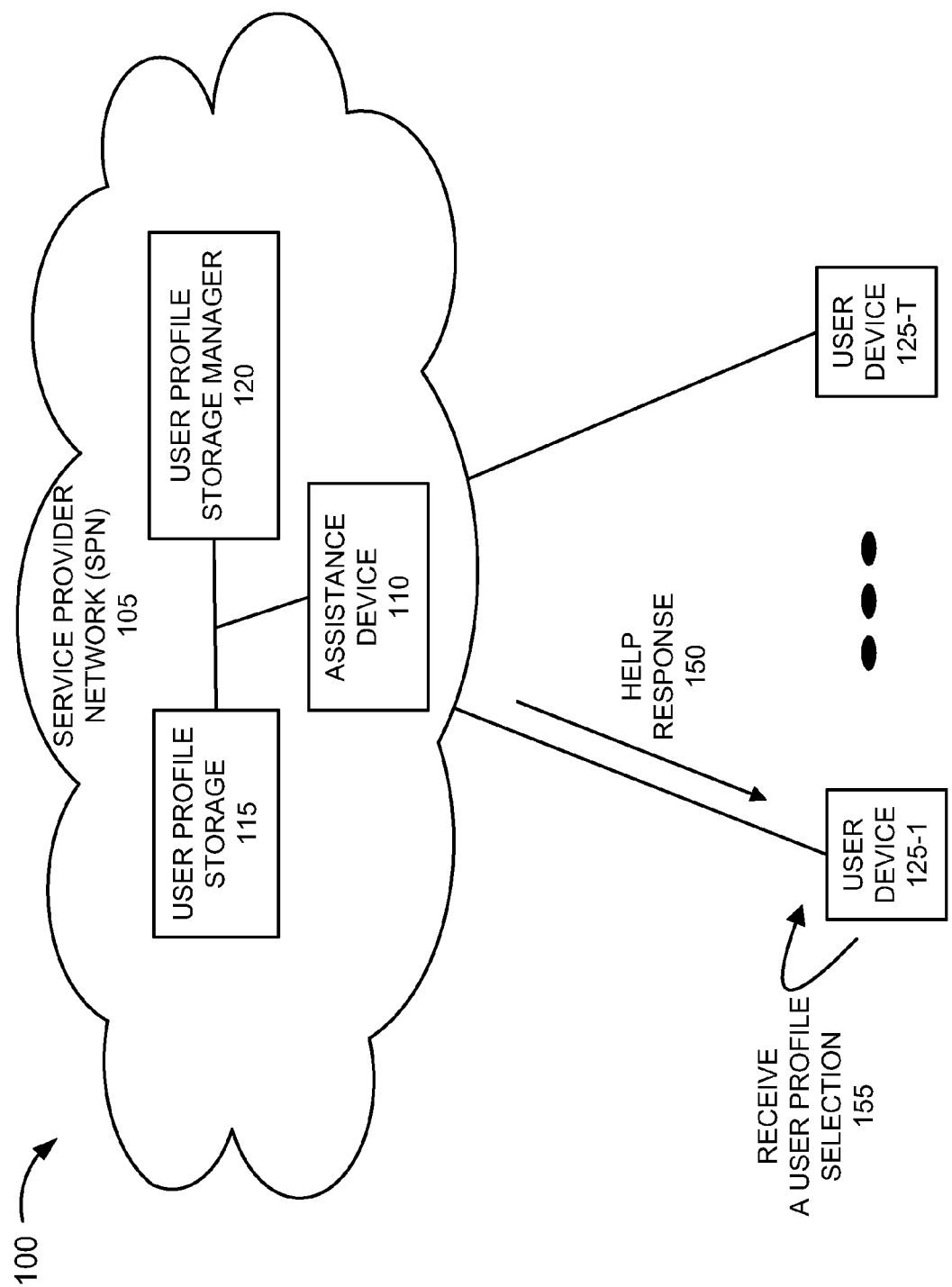

USER PROFILE-BASED ASSISTANCE COMMUNICATION SYSTEM

BACKGROUND

Location-aware devices can provide maps to users based on the users' location requests. Additionally, location-aware devices may provide additional information pertaining to locations based on location services. However, location services are limited due to stale information (e.g., information not being updated) and/or coverage of information (e.g., the information available is limited in terms of scope, specificity, etc.).

BRIEF DESCRIPTION OF THE DRAWINGS

FIGS. 1B-1E are diagrams illustrating an exemplary process for providing user profile-based user assistance;

DETAILED DESCRIPTION OF PREFERRED EMBODIMENTS

Figure 1A:
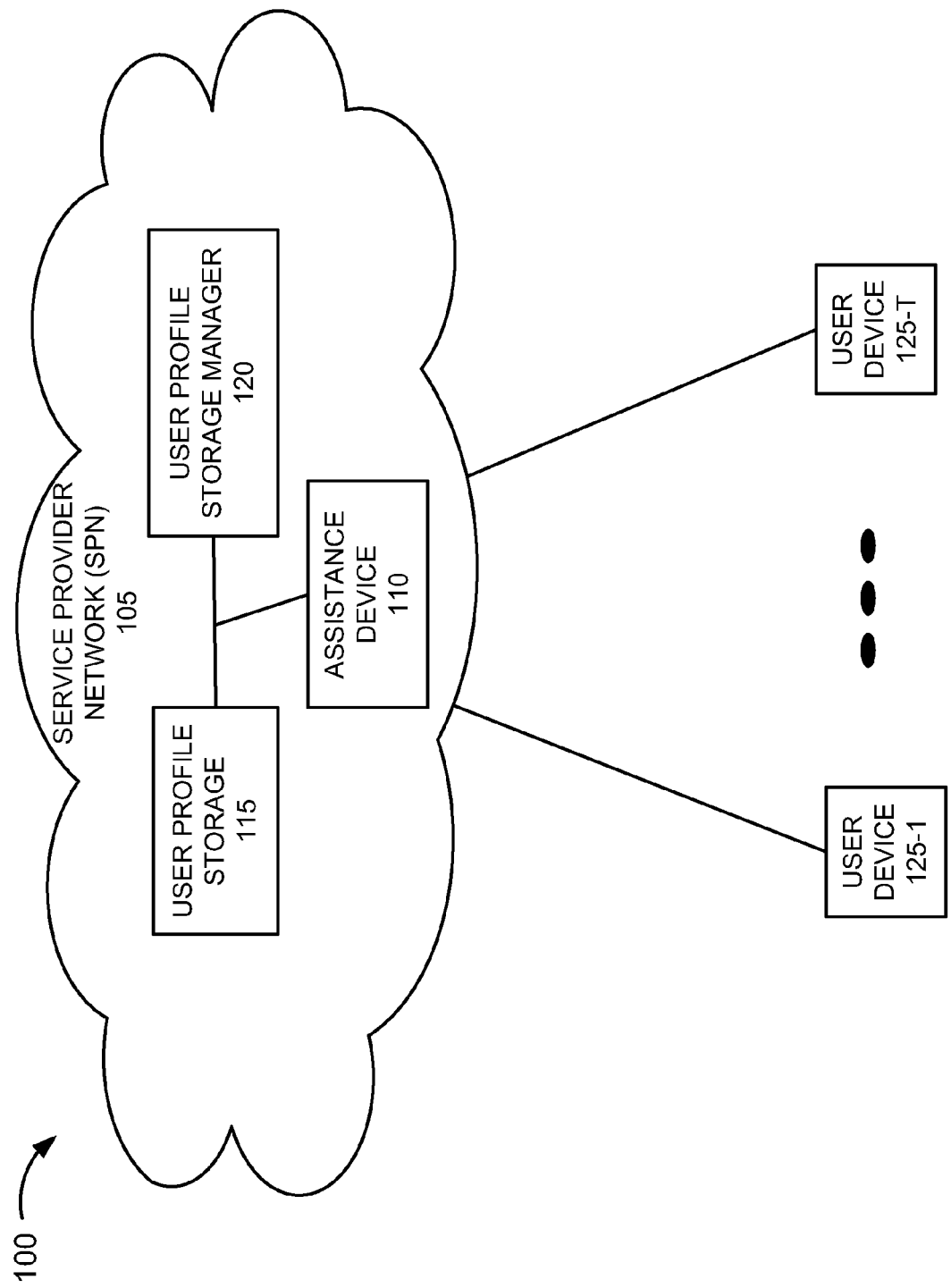
FIG. 1A is a diagram illustrating an exemplary environment in which an exemplary embodiment of a user profile-based assistance communication system may be implemented.

The following detailed description refers to the accompanying drawings. The same reference numbers in different drawings may identify the same or similar elements. Also, the detailed description does not limit the invention.

According to an exemplary embodiment, a profile-based assistance communication system permits users to ask for help from other users based on user profiles. According to an exemplary embodiment, the user profile may include information about the user FIG. 1 is a diagram illustrating an exemplary environment 100 in which an exemplary embodiment of a profile-based assistance communication system may be implemented. As illustrated in FIG. 1, environment 100 may include a service provider network (SPN) 105 and user devices 125-1 through 125-T (referred to individually as user device 125 or collectively as user devices 125). Service provider network 105 may include, among other devices, an assistance device 110, a user profile storage 115, and a user profile storage manager 120.

The number of devices and networks, and the configuration in environment 100 is exemplary and provided for simplicity. In practice, according to other embodiments, environment 100 may include additional devices, fewer devices, different devices, and/or differently arranged devices, than those illustrated in FIG. 1. Additionally, according to another embodiment, environment 100 may include additional networks, fewer networks, and/or differently arranged networks, than those illustrated in FIG. 1.

Also, according to another embodiment, one or more functions and/or processes described as being performed by a particular device may be performed by a different device or a combination of devices. For example, according to an embodiment, a function or a process described as being performed by two or more devices may be performed by a single device. Conversely, according to another embodiment, a function or a process described as being performed by a single device may be performed by two or more devices or by a different device. By way of example, one or more functions and/or processes described as being performed by user profile storage manager 120 may be performed by assistance device 110 or vice versa. Also, user profile storage manager 120 may be combined with user profile storage 115. Environment 100 may include wired and/or wireless connections among the devices illustrated.

Service provider network 105 may include a network that distributes or makes available a service, such as, a user assistance service. Service provider network 105 may also include a network that distributes or makes available mobile service, Internet service, and/or a television service. Service provider network 105 may include a satellite-based network and/or a terrestrial-based network. For example, service provider network 105 may include a wireless network (e.g., a cellular network, a non-cellular network, a mobile network, a $3^{rd}$ Generation (3G) network, a $4^{th}$ Generation (4G) network) in combination with a Voice over Internet Protocol (VoIP) network, a packet-switched network, a television distribution network, and/or the Internet. Although not illustrated, service provider network 105 may include, for example, billing devices, security devices, etc.

Assistance device 110 may service requests for assistance associated with a user profile-based assistance service. Assistance device 110 receive assistance requests from users and select user profiles associated with the other users that may be most likely to offer assistance. Assistance device 110 provides the selected user profile(s) to the user seeking assistance to allow the user to select a user profile and receive assistance from that other user. Assistance device 110 is described further below.

Assistance device 110 may be implemented by one or multiple network devices. For example, the network device(s) may include a computational device (e.g., a computer, a server, an Application server, a web server, a peer device, etc.) or a cloud-computing service. Assistance device 110 may provide user interfaces to users. Assistance device 110 will be described further below.

User profile storage 115 may store user profile information. According to an exemplary embodiment, the user profile information may be stored as a database (e.g., a relational database, a distributed database, a document-oriented database, or other type of suitable database). According to other embodiments, the user profile information may be stored as a data structure (e.g., files, records, arrays, lists, objects, etc.). The user profile information may also be indexed based on one or more types of user profile information types (e.g., location where user lives and/or works, age of user, etc.). User profile storage 115 may be implemented by one or multiple network devices. For example, the network device(s) may include a storage device (e.g., a hard disk or other tangible storage medium) and/or a computational device (e.g., a computer, a server, etc.).

Each user profile may include information pertaining to a user. For example, according to an exemplary embodiment, a user profile may include information indicating a name of the user, a photo of the user, information indicating a location of the user (e.g., city, state, etc.), information indicating the profession of the user (e.g., policeman, professor, student, teacher, plumber, etc.), information indicating the number of years the user has lived and/or worked in a particular area (e.g., 10 years, 3 years, 2 months, etc.), and information indicating a user rating (e.g., a numerical value, a star rating, etc.). For example, the user rating may indicate an average rating by other users that corresponds to an evaluation of the user's assistance. According to another embodiment, a user profile may include additional, fewer, or different types of information. By way of example, the user profile may include information pertaining to a user's availability (e.g., days (e.g., Monday-Friday, etc.), times (e.g., between 6 p.m.-11 p.m., evenings, mornings, etc.), dates, (January-August), etc.), a user's choice of communication to provide assistance (e.g., telephone, video-telephony, etc.), a user's choice of notification (e.g., via television service, via mobile service, via Internet service), a user category of expertise or knowledge relative to a particular geographic location (e.g., restaurants, shopping, driving, etc.), and/or a user's driving history (e.g., number of years driving in a particular geographic location).

User profile storage manager 120 may manage user profile storage 115. For example, user profile storage manager 120 may control the creation, maintenance, and use of user profile information stored by user profile storage 115. User profile storage manager 120 may also permit access and retrieval of user profiles based on queries. User profile storage manager 120 may be implemented by one or multiple network devices. For example, the network device(s) may include a computational device (e.g., a computer, a server, an application server, a database server, etc.) that includes a database management system that supports, among other things, a data model and a query language, and controls data access, data integrity, etc. User profile storage manager 120 will be described further below.

User device 125 may include, for example, a mobile device, a handheld device, a tablet device, or a vehicle-based device. For example, user device 125 may take the form of a wireless phone (e.g., a smart phone, a cell phone, an iPhone™ device, etc.), an Internet-access device (e.g., a netbook, an iPad™ device, etc.), or a vehicular communication system.

User device 125 may have location-aware capability. A variety of technologies or techniques (e.g., Global Positioning System (GPS), cellular positioning methods (e.g., triangulation, etc.), local positioning methods (e.g., Bluetooth, IEEE 802.11, WiFi, Ultra Wide Band (UWB), etc.)) exist to identify a geographic position associated with a user or a user device. However, these technologies may provide the user's geographic position or a geographic position of the user device with different degrees of precision or accuracy. While, a GPS is a popular technology that enables the user or the user device to obtain geographic positional information, the GPS typically does not work well inside buildings or underground due to the absence of line of sight to satellites and attenuation and scattering of signals caused by roofs, walls, and other objects. In this regard, other technologies, such as, for example, an indoor positioning system (IPS) may be utilized. Thus, while the description that follows may describe embodiments that utilize a GPS, other technologies or techniques may be utilized to obtain the geographic position of the user or the user device. User device 125 may be capable of communicating with one or more devices in service provider network 105.

FIGS. 1B-1E are diagrams illustrating an exemplary process for providing profile-based user assistance. According to an exemplary scenario, assume that a user of user device 125-1 (not illustrated) is driving in his/her car and wishes to acquire information pertaining to a destination (e.g., at downtown Boston). In this example, user device 125-1 may take the form of a vehicular communication system or a mobile device. For example, the vehicular communication system may include a GPS, a wireless adapter (e.g., a 3G wireless adapter, a 4G wireless adapter, etc.), an on-board speaker and microphone system, and a display (e.g., a touch display). The vehicular communication system may include a video camera and/or speech recognition system. The vehicular communication system may include a vehicle-to-vehicle, profile-based assistance application. The vehicle-to-vehicle, profile-based assistance application may permit a user to communicate with other users and permit the user to ignore, accept, start, and end a vehicle-to-vehicle communication. According to an exemplary implementation, the vehicle-to-vehicle, profile-based assistance application may include a safety feature that requests the user to fasten his/her seatbelt before using the system.

According to an exemplary embodiment, the vehicle-to-vehicle, profile-based assistance application may permit the user to record, play, stop, rewind, loop, delete, fast-forward, etc. a conversation with another user. Additionally, according to an exemplary embodiment, the vehicle-to-vehicle, profile-based assistance application may permit the user to send geographic location information (e.g., a GPS screenshot, address information, a map, and/or other location information) of the user's location to the other user offering assistance.

Figure 1B:
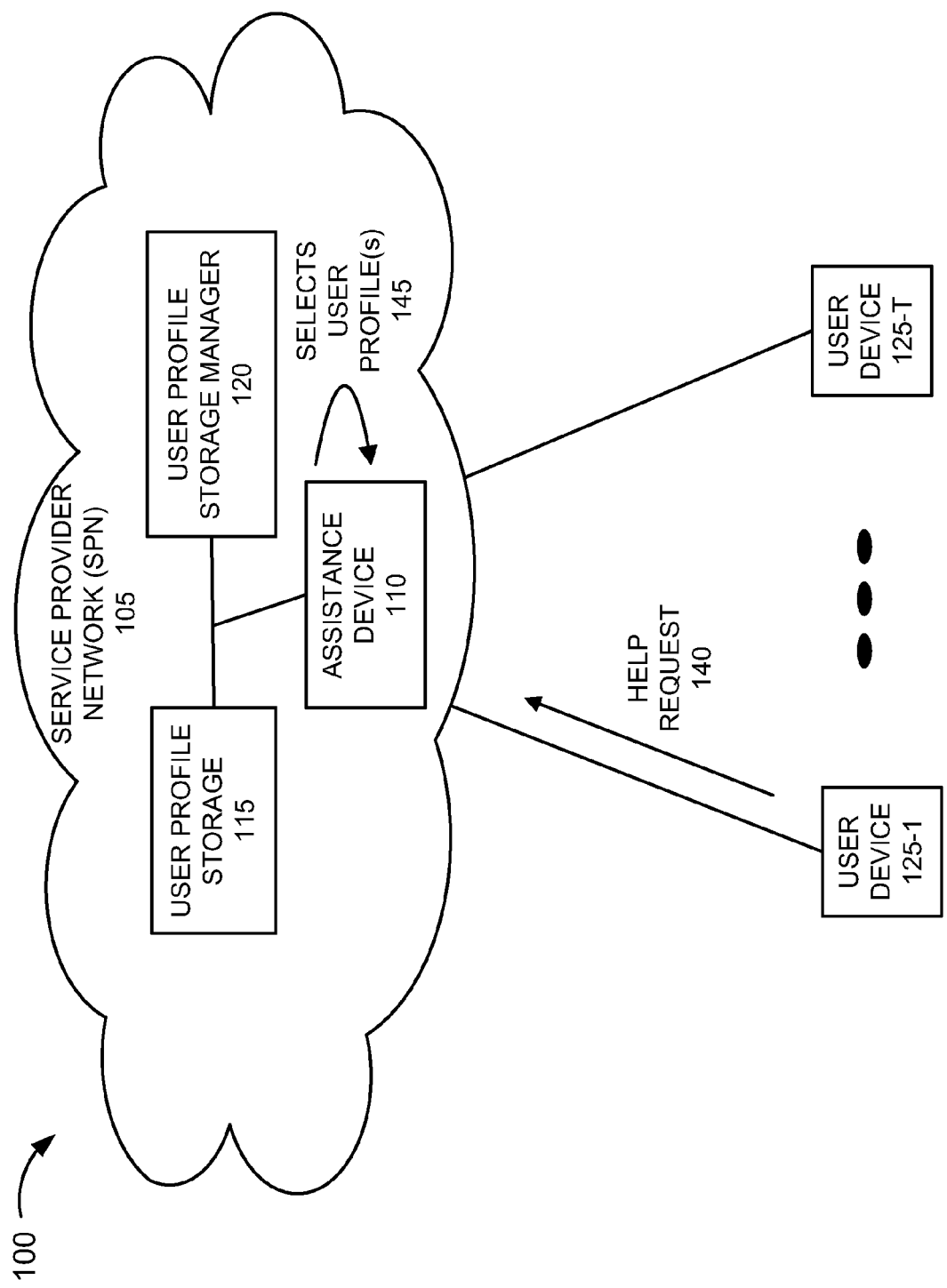

Referring to FIG. 1B, assume the user uses voice command (e.g., the user says "help") or presses a help button (e.g., an icon) displayed on user device 125-1 via a graphical user interface (GUI). The user is then prompted to provide a destination. In this example, the user indicates downtown Boston. According to an exemplary embodiment, user device 125-1 generates a help request 140 that includes the destination information.

According to another embodiment, the user may have already specified a destination (e.g., via a GPS system). According to such circumstances, when the user invokes user profile-based assistance, the destination information may be captured and the user may not need to be prompted for the destination.

According to other implementations, the user may be prompted to enter additional information that further specifies the type of assistance. According to an exemplary embodiment, user device 125-1 generates a help request 140 that includes the destination information and the type of assistance. By way of example, the GUI may provide different categories of assistance (e.g., location assistance, monetary assistance, restaurant assistance, shopping assistance, lodging assistance, etc.). For example, location assistance may provide assistance to a user regarding specifics of a particular destination. For example, if a user is traveling to a park, the GPS information may provide the location of the park. However, the GPS information may not indicate where the main entrance is to the park or whether there is anywhere to go fishing in the park. The user may contact a friend or a relative to find out this information. However, the friend or relative may not have ever visited the park. Further, if the user is in a vehicle, the user may be less inclined to stop and ask a stranger for particular information.

According to other scenarios, the user may be interested in knowing which parking lot to park in a ski resort or the user may be in a stadium and wishes to know where the expo is located and which way to travel. Monetary assistance may provide, for example, assistance to a user regarding saving money. For example, the user may wish to park in a parking garage but does not know which one in the vicinity has the best rate. Additionally, for example, the restaurant assistance, the shopping assistance, and the lodging assistance may provide assistance to a user by providing recommendations to restaurants, stores or shopping centers, lodging (e.g., motels, hotels, inns, bed-and-breakfasts, etc.), etc. The description of these categories is not intended to be exhaustive and additional categories may be implemented (e.g., repair garage, tours of the area, etc.). Additionally, a category may include sub-categories that further narrow the type of assistance. By way of example, monetary assistance may include sub-categories, such as parking, food, etc. Additionally, a user may specify other types of information pertaining to help request 140. For example, the user may indicate a priority level for help request 140, such as urgent, normal, etc. As an example, a user may wish to assign an urgent priority level for help request 140 when the user is pressed for time (e.g., running late for an appointment, etc.) or some other urgent circumstance exists.

As illustrated in FIG. 1B, help request 140 may be transmitted from user device 125-1 to service provider network 105. Assistance device 110 may receive help request 140 and select one or more user profiles 145 based on the information included in the help request 140. For example, assistance device 110 may generate a query and transmit the query to user profile storage manager 120 in which user profiles stored by user profile storage 115 may be accessed and selected. The query may include the destination (e.g., in this example, is downtown Boston), and the type of assistance (e.g., monetary assistance, parking). Assistance device 110 may receive a query response that includes one or more user profiles.

According to an exemplary embodiment, assistance device 110 may select the best user profile(s) included in the query response based on help request 140 and the information included in each user profile. For example, according to an exemplary embodiment, assistance device 110 may include a ranking algorithm that ranks user profiles based on the area where the user lives, the amount of time the user has lived and/or worked in the area, the profession of the user, the user rating, and the destination. According to other embodiments, assistance device 110 may use additionally, fewer, or different types of information. For example, assistance device 110 may use the type of user assistance (e.g., in this example, monetary assistance, parking), the availability of the user, whether the user is also currently driving, and/or other information included in a user profile.

According to an exemplary embodiment, the ranking algorithm may use a weighting system in which each type of information is assigned a weighted value. According to an exemplary implementation, some types of information may be afforded a higher weight relative to other types of information. By way of example, the length of time the user lived and/or worked in the area may be afforded a greater weight than the profession of the user. According to an exemplary implementation, the weight assigned to each type of user profile information may also be dependent on the information itself. For example, a user that has lived in the area for 30 years may be assigned a greater weighted value for this type of information than a user that has lived in the area only 10 years. According to another example, a user whose profession is a doctor, a policeman, a teacher, or an attorney may be assigned a greater weighted value for this type of information than a user that is a student, a nurse, etc.

According to an exemplary embodiment, assistance device 110 may select the best user profile candidates to offer assistance to the user based on the ranking algorithm. According to an exemplary implementation, assistance device 110 may also filter user profile candidates based on whether a user is active with service provider network 105. For example, if a user does not have a mobile device turned on, is not driving, and is not watching television then service provider network 105 may remove a user profile based on the user's unavailability. Alternatively, according to an exemplary embodiment, assistance device 110 may not determine the availability of a user until an assistance request for that user is received, as described below.

Referring to FIG. 1C, once assistance device 110 selects the best user profiles, assistance device 110 sends a help response 150 to user device 125-1. The user may then review the user profiles. For example, since the user is driving, the user profiles may be displayed and the vehicle communication system may read the user profiles to the user. Alternatively, the user may navigate through the user profiles via a GUI displayed by the touch display. In this example, the user selects one of the user profiles (e.g., vocally or via touch display) and user device 125-1 receives the user profile selection 155.

Figure 1D:
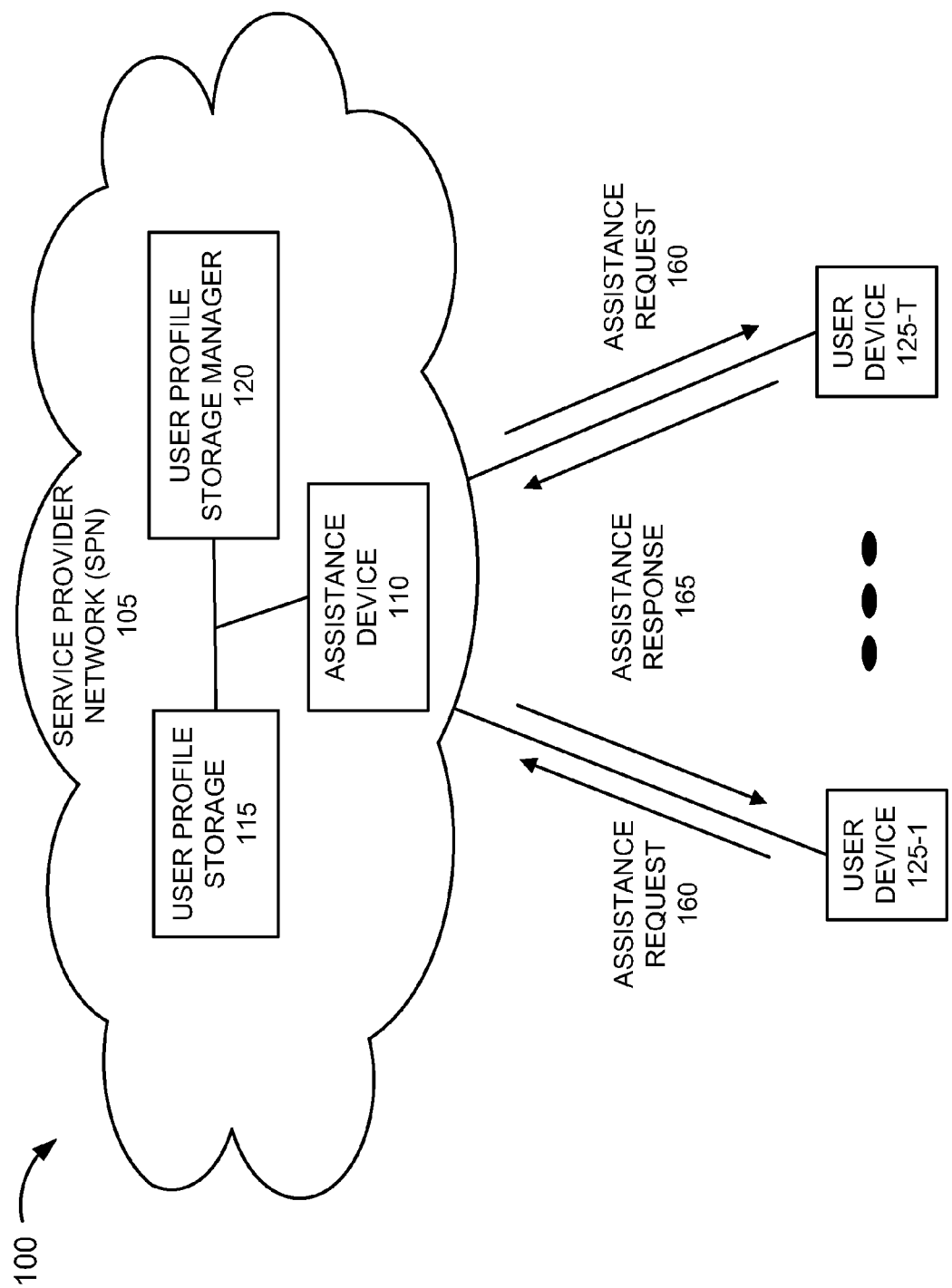

Referring to FIG. 1D, user device 125-1 generates and transmits an assistance request 160 that is sent to user device 125-T via service provider network 105. In this example, the user of user device 125-T is also driving and has a vehicular communication system that service provider network 105 recognizes as active. Service provider network 105 may route assistance request 160 to the vehicular communication system. Alternatively, assistance request 160 may be routed to another type of user device 125 (e.g., a smart phone, etc.).

As previously described, a user profile may include information pertaining to a user's choice of notification. For example, the user may indicate that he/she may be notified via a particular device (e.g., vehicular communication system, mobile device) and/or via a particular service (e.g., mobile service, television service, etc.). Service provider network 105 may consider these parameters when routing assistance request 160. Additionally, service provider network 105 may also consider whether the user is active with respect to service provider network 105. For example, when the user's vehicle is turned-off, service provider network 105 would not route assistance request 160 to the vehicular assistance communication. Similarly, if the user's mobile device is turned-off, service provider network 105 would not route assistance request 160 to the user's mobile device. As previously described, a user may receive profile-based communications via various services (e.g., mobile, Internet, television). In this regard, according to an exemplary implementation, service provider network 105 may select a user device that is currently active.

In this example, the user of user device 125-T is alerted (e.g., an auditory cue (e.g., telephone ring, etc.), a visual cue (e.g., an image indicating that an assistance request has been received is displayed on the touch display)) to the receipt of assistance request 160. The user of user device 125-T has the option to accept the request or ignore it. In this example, the user of user device 125-T accepts assistance request 160 vocally (e.g., a voice command (e.g., "answer," "accept," etc.)) or presses an icon on the touch display (e.g., an answer button, etc.) and an assistance response 165 is sent to user device 125-1. Thereafter, a live one-to-one conversation may begin. The communication link between the users may stop when either user terminates it vocally (e.g., voice command) or pressing an icon on the touch display. During the conversation, either user may record the conversation using a voice command or via the touch display. The user may also have available other commands, such as pause, play, stop, rewind, fast-forward, loop, etc.

According to an exemplary embodiment, during recording, the conversation may be stored on user device 125 and/or streamed to assistance device 110 or some other network device (not illustrated) in service provider network 105. As previously described, a user may play, replay, loop, etc., a recording of a conversation, which may be stored on user device 125, assistance device 110, or another network device in service provider network 105 (e.g., a server, a computer, a web server, an application server, a peer device, etc.).

According to an exemplary embodiment, the communication link between users in the vehicle may be based on a VoIP telecommunication service (e.g., offered by the service provider of service provider network 105) through a radio wave channel of a wireless network. According to other embodiments, the communication link between users in the vehicle may be based on other protocols, networks, etc.

Figure 1E:
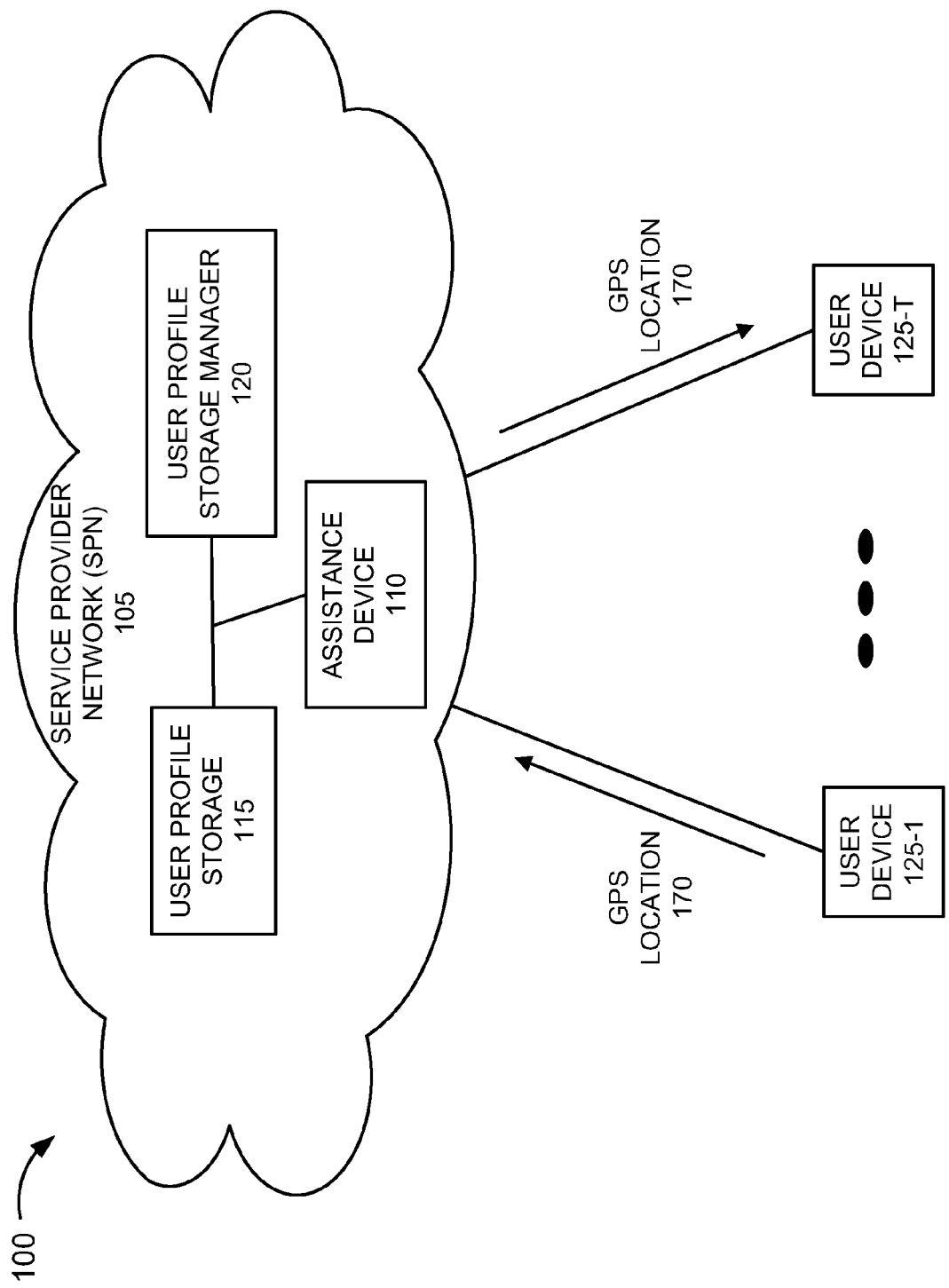

According to an exemplary embodiment, the user seeking assistance may send geographic location information (e.g., a GPS screenshot, address information, a map, and/or other location information) of the user's location to the other user offering assistance, as illustrated in FIG. 1E. By way of example, according to this scenario, the vehicular communication system may provide a GPS map via the touch display and the user may select a location on the GPS map to send to the other user. The other user may receive the location information via the vehicular communication system. For example, the location of the user may be indicated on the other user's GPS map. According to other implementations, the GPS location of the user may automatically be included in assistance request 160. The user may be able to set a user preference pertaining to this feature.

According to an exemplary embodiment, after completion of the communication, the user seeking assistance may be prompted to rate the performance of the user offering assistance. By way of example, the user may rate the other user's performance based on a numerical scale (e.g., 1-10) or some other form of rating system via voice command or via the touch display. The rating of the other user may be applied (e.g., averaged) to other ratings for the other user and included in the other user's user profile. Additionally, or alternatively, the user may be prompted to rate other aspects of the user's experience relative to the other user (e.g., friendliness, usefulness, eagerness or willingness to help other people, etc.). The rating of these aspects may also be included in the other user's profile.

The processes and messages illustrated in FIGS. 1B-1E and described are exemplary. According to other embodiments, different processes and/or messages may be implemented. For example, depending on user device 125 of the user requesting assistance or user device 125 of the user providing the assistance, different processes and/or messages may be implemented. By way of example, service provider network 105 (e.g., assistance device 110) may send an assistance request to another user via a set top box or other type of SPN television service interface device. For example, an overlay may be generated that indicates an assistance request has been received. The assistance request may include a telephone number or permit video conferencing via the television (e.g., assuming previous set-up and equipment (e.g., video camera, etc.). The other user may ignore or accept the assistance request via a remote control device of the television or the set top box. According to another example, the other user may be using Internet service on his/her desktop computer or other type of user device (e.g., mobile device, netbook, etc.), and an assistance request may be routed to the other user.

Figure 2:
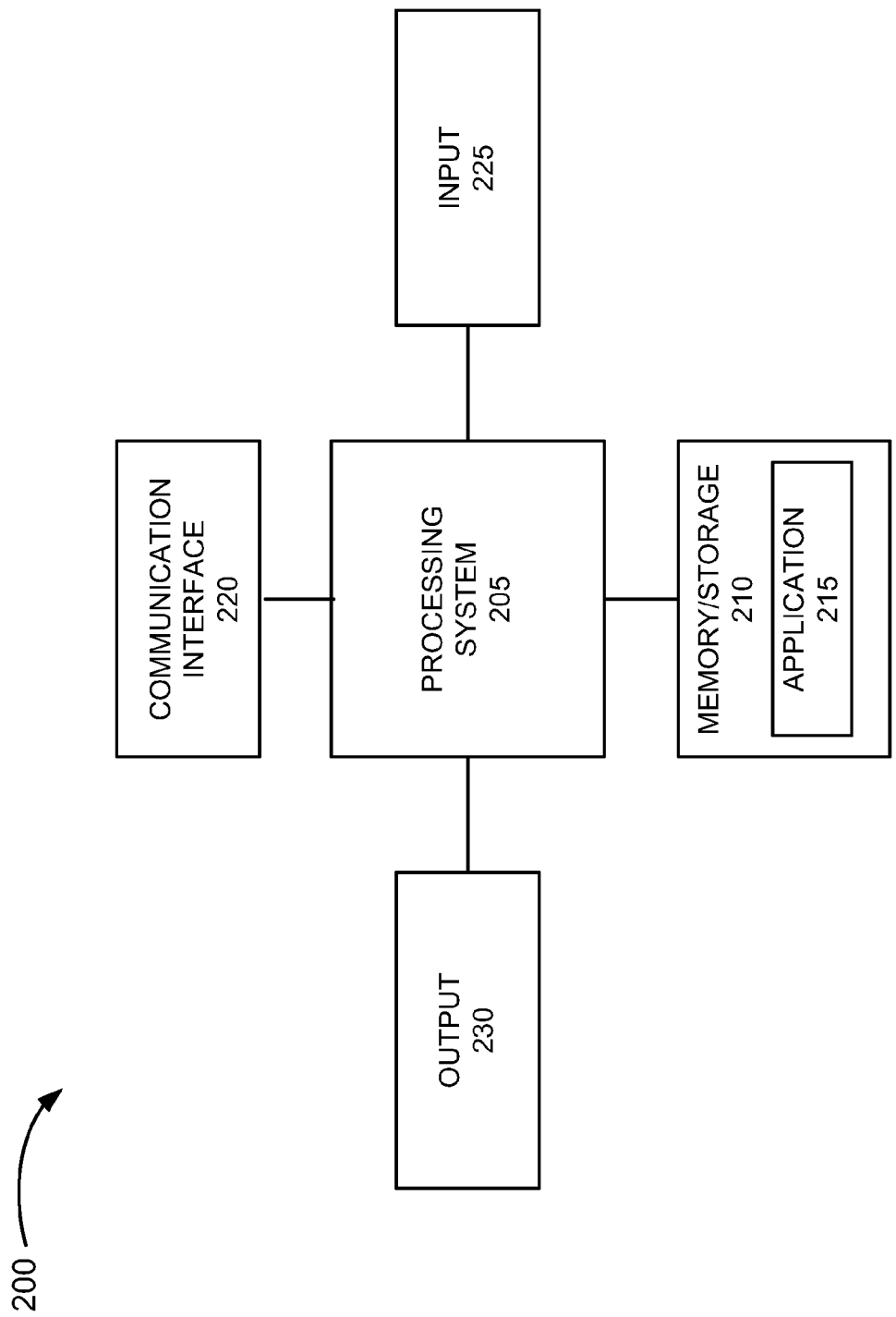
FIG. 2 is a diagram illustrating exemplary components of a device that may correspond to one or more of the devices depicted in FIGS. 1A-1E.

FIG. 2 is a diagram illustrating exemplary components of a device 200 that may correspond to one or more of the devices in environment 100. For example, device 200 may correspond to one or more devices in service provider network 105 and user device 125. As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SOCs), central processing units, and/or microcontrollers to interpret and execute instructions. Depending on the type of processing system 205, processing system 205 may be implemented as hardware, a combination of hardware and software, may include a memory (e.g., memory/storage 210), etc.

Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) or a floppy disk (e.g., a zip disk, etc.) and a corresponding drive, a tape, a Micro-Electromechanical System (MEMS)-based storage medium, and/or a nanotechnology-based storage medium. Memory/storage 210 may include drives for reading from and writing to the tangible storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 210 may store data, application(s), and/or instructions related to the operation of device 200.

Application 215 may include software or a program that provides various services and/or functions. For example, with reference to assistance device 110, application 215 may include a help-assistance application or program based on the processes and/or functions described herein. Additionally, for example, with reference to user profile storage manager 120, application 215 may include a database management application or database management program that manages user profiles stored by user profile storage 115. Additionally, for example, with reference to user device 125, application 215 may include a user profile-based assistance application or program for permitting user profile-based assistance communication, user interfaces, etc., to a user.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and the like.

Input 225 may permit an input into device 200. For example, input 225 may include a keyboard, a mouse, a camera, a scanner, a microphone, a display, a touchpad, a button, a switch, an input port, speech recognition logic, fingerprint recognition logic, a web cam, a video camera, and/or some other type of visual, auditory, tactile, etc., input component. Output 230 may permit an output from device 200. For example, output 230 may include a speaker, a display, a light, an output port, and/or some other type of visual, auditory, tactile, etc., output component.

Device 200 may perform processes in response to processing system 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

Figure 3:
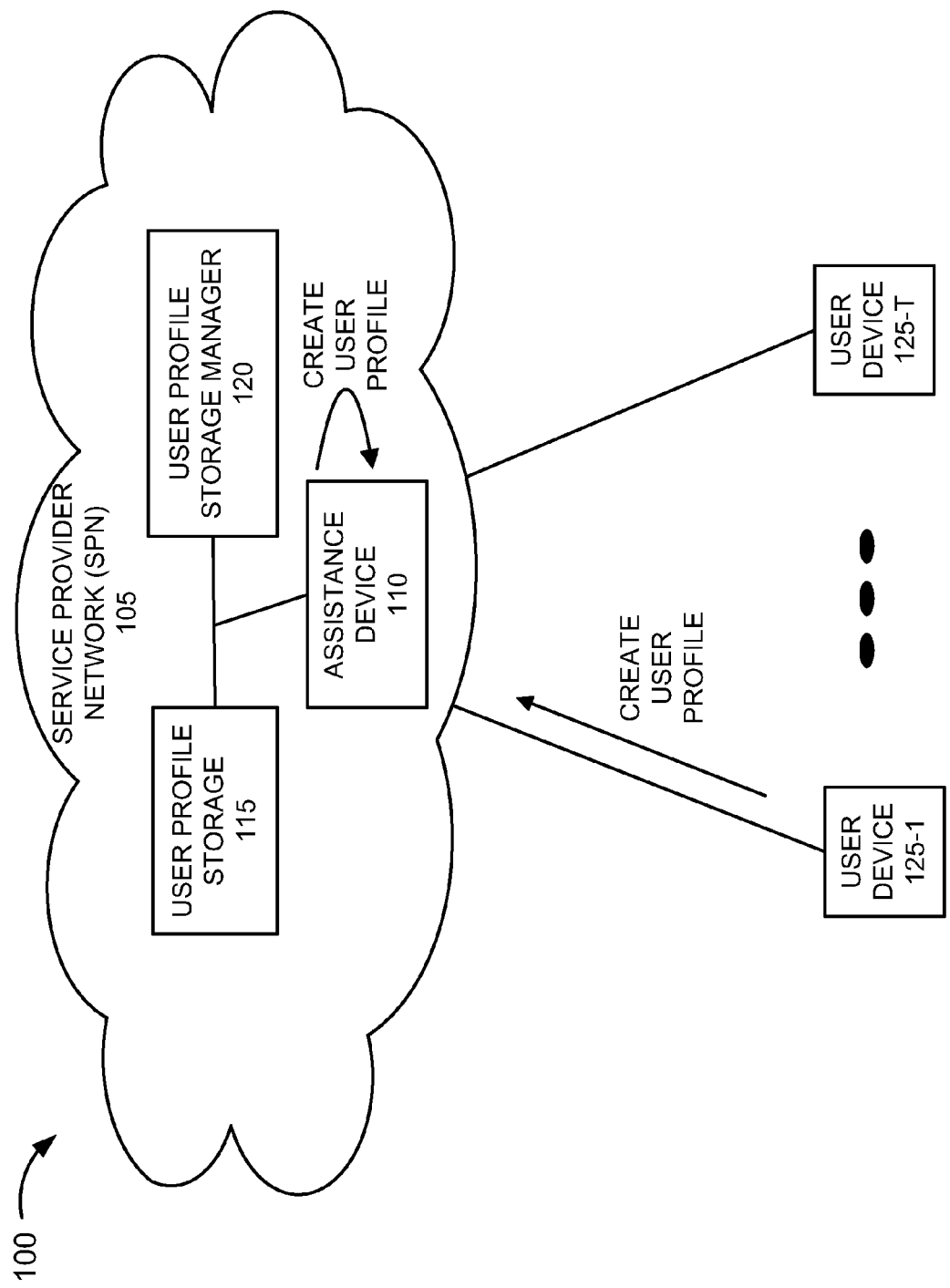
FIG. 3 is a diagram pertaining to the setting-up of a user profile.

As previously described, according to an exemplary embodiment, a profile-based assistance communication system permits users to ask for help from other users based on user profiles. According to an exemplary embodiment, the user profile may include information about the user. FIG. 3 is a diagram pertaining to the setting-up of a user profile.

According to an exemplary implementation, a user profile-based assistance application residing on user device 125-1 may include a set-up procedure in which a user may create his/her user profile and set up user preferences. According to an exemplary embodiment, user device 125 and assistance device 110 may provide the means for a user to create his/her user profile and set up user preferences, as illustrated in FIG. 3.

Figure 4:
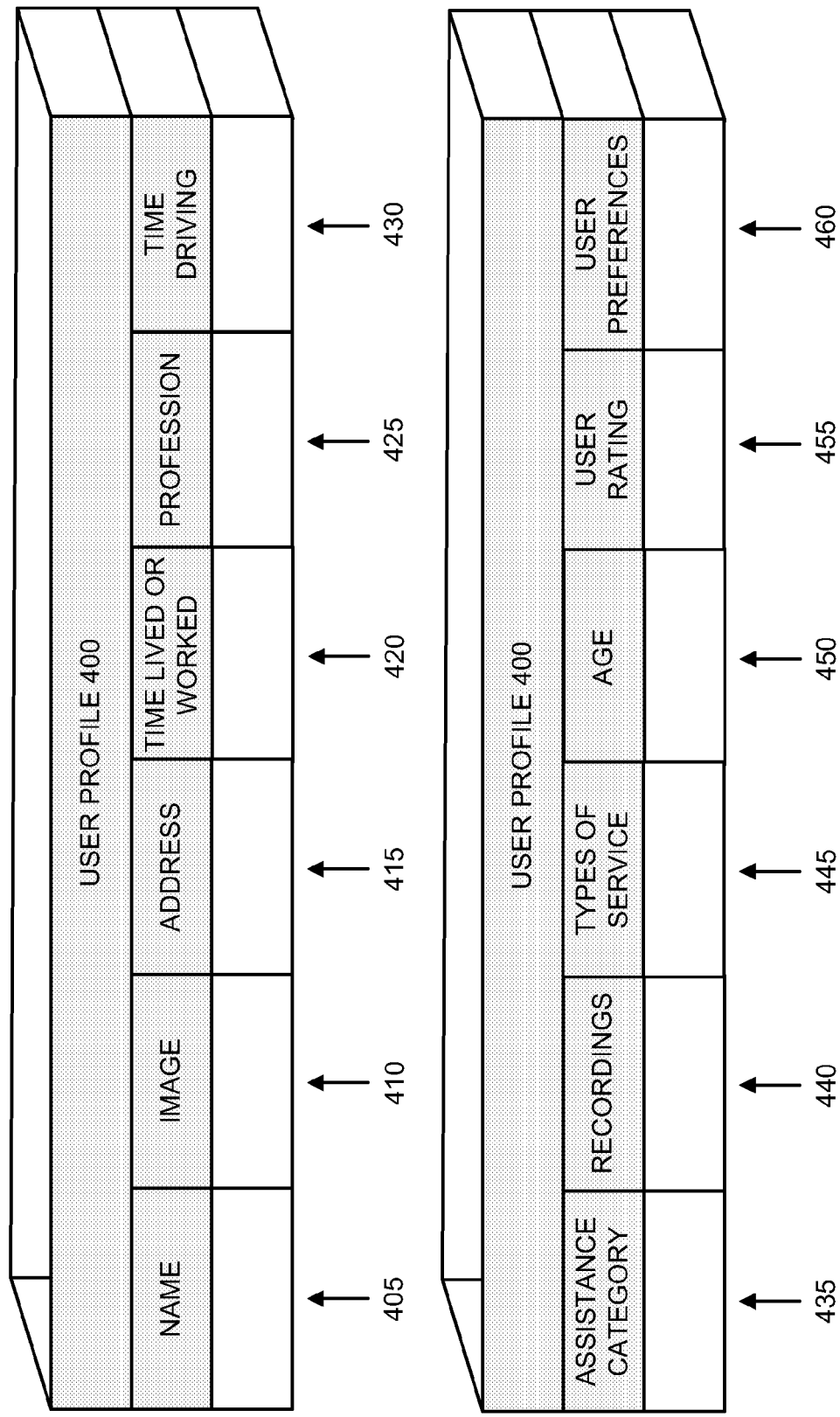
FIG. 4 is a diagram illustrating an exemplary user profile stored by user profile storage depicted in FIGS. 1A-1E.

FIG. 4 is a diagram illustrating an exemplary user profile 400 stored by user profile storage 115. As illustrated, user profile 400 may include a name field 405, an image field 410, an address field 415, a time lived or worked field 420, a profession field 425, a time driving field 430, an assistance category field 435, a recordings field 440, a types of service field 445, an age field 450, a user rating field 455, and a user preferences field.

According to other embodiments, user profile 400 may additional, different, or fewer types of information. For example, user profile 400 may include an additional field that indicates level of education. As an example, an educational field may indicate whether a user completed college. Alternatively, the educational field may indicate the number of years of college (e.g., 2 years, 4 years, 6 years, etc.), degree level (e.g., associate, bachelor, master, doctorate, etc.), and/or type of degree(s) (e.g., MBA, J.D., B.S., etc.).

Name field 405 may store the user's name, such as first name or first name and last name. Image field 410 may store a picture of the user. Address field 415 may store the user's home and/or work address, such as city, state, and zip code. Time lived or worked field 420 may store the length of time (e.g., the number of years, months, etc.) the user has lived or worked at the address(es). Profession field 425 may store the user's profession, such as, doctor, attorney, teacher, etc. Time driving 430 may store the length of time (e.g., the number of years, months, etc.) the user has driven at the address(es). Assistance category field 435 may store one or more categories (e.g., monetary, shopping, restaurants, etc.) and/or sub-categories in which the user feels he/she can offer assistance. Recordings field 440 may store recorded audio conversations or video telephony communications, as requested by the user.

Types of service field 445 may store the types of service the user has with respect to the service provider. For example, the user may have, in addition to, the user profile-based assistance service, other types of service, such as mobile service, Internet service, and/or television service. This information may be used, among other things, to notify the user of assistance requests, etc. Age field 450 may store the user's age or age category (e.g., young, middle age, senior, etc.). User rating field 455 may store the user's rating based on other user's feedback. User preferences field 460 may store the user's preferences pertaining to the user profile-based assistance service. By way of example, as previously described, the user may set user availability (e.g., schedule), a user's preference of notification (e.g., via mobile service, etc.), and/or weighting preferences pertaining to selecting best user profiles. For example, the user may prefer other users of the same profession, age or age bracket, etc. According to an exemplary implementation, assistance device 110 may select the best user profiles to offer assistance for a user based on the user's preferences.

Figure 5:
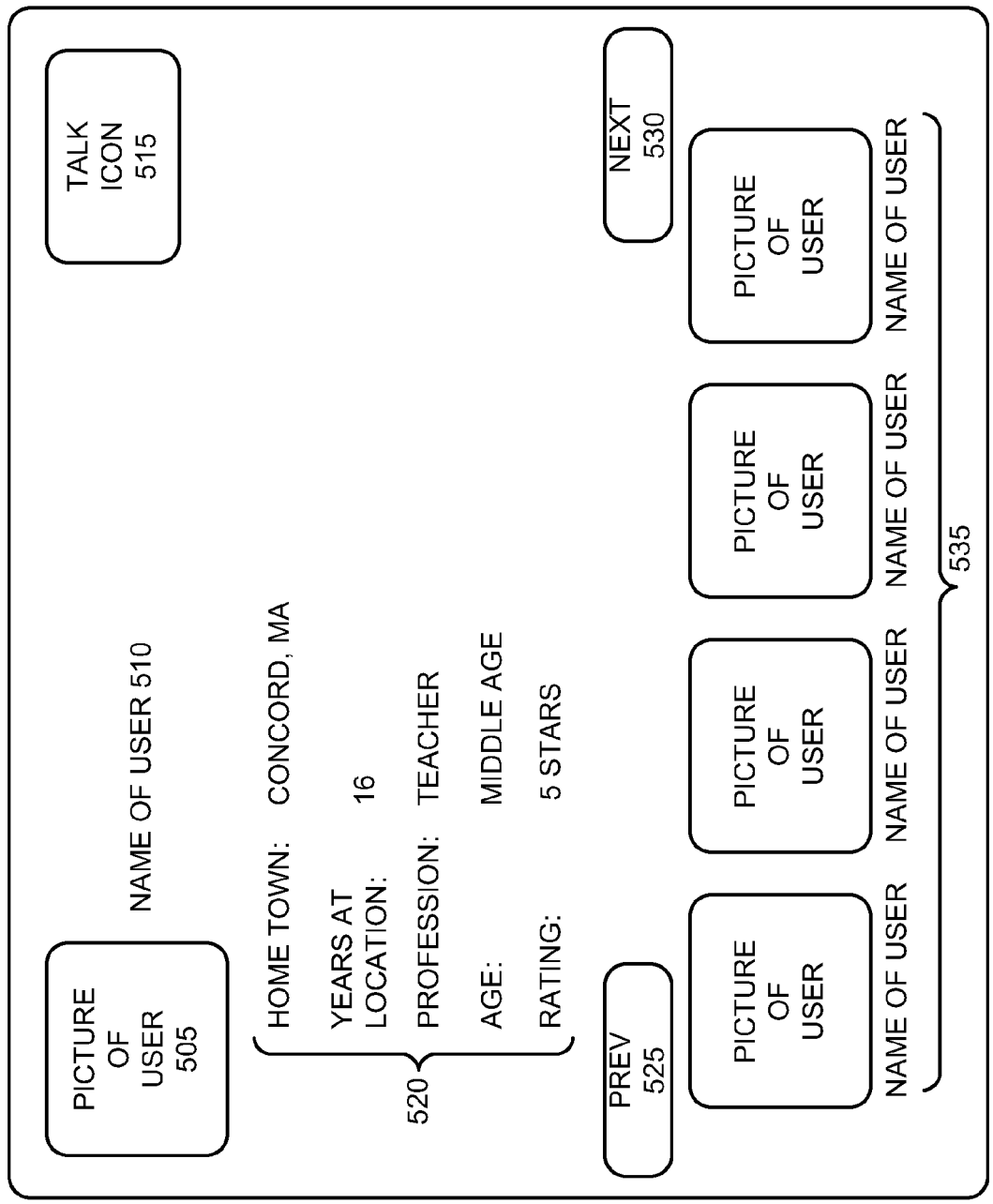
FIG. 5 is a diagram illustrating an exemplary graphical user interface of a user's profile.

FIG. 5 is a diagram illustrating an exemplary GUI of a user's profile that may be viewed by other users. For example, assistance device 110 may provide a list of best user profiles from which a user may select when requesting assistance. As illustrated, the GUI may include a picture of the user 505, a name of the user field 510, a talk icon 515, other user profile information 520 (e.g., address, years at location, profession, age, user rating), a previous icon 525 and a next icon 530 to permit the user to review other user profiles, and other user profiles 535 (e.g., names and pictures of other users) from which the user may select when requesting assistance.

Figure 6:
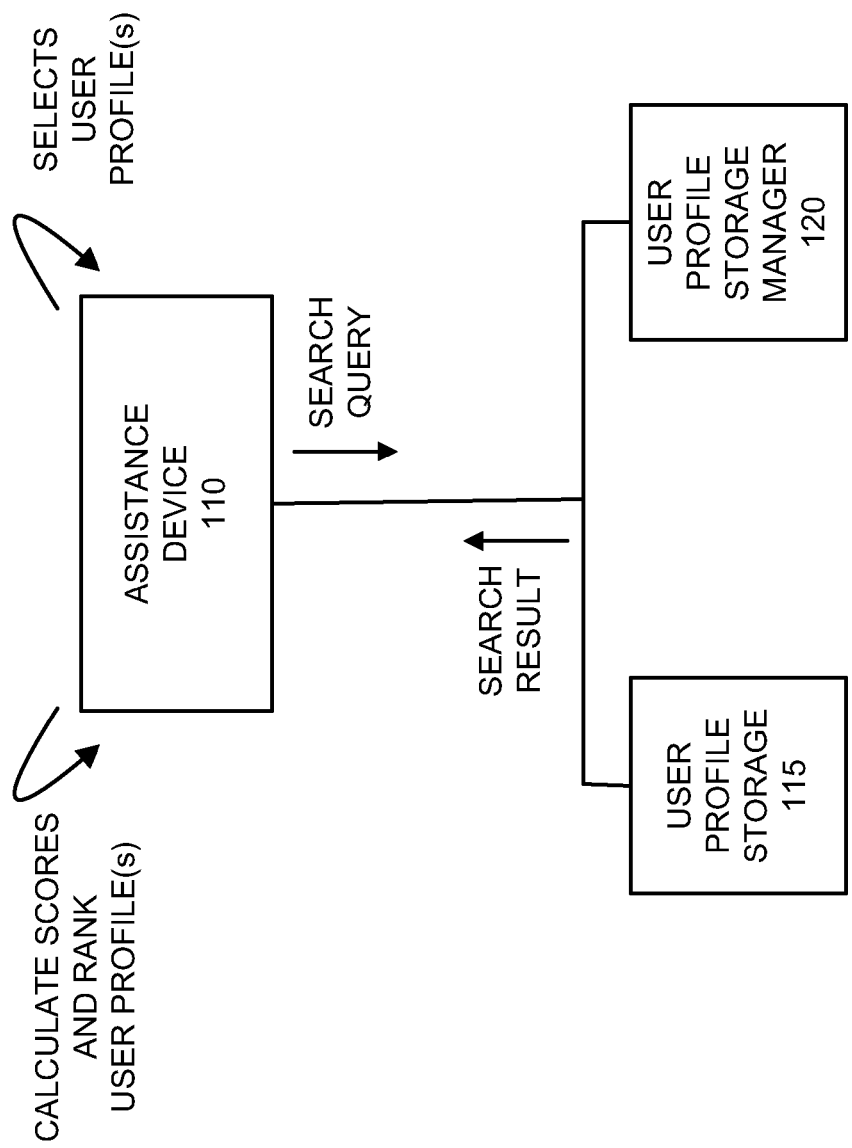
FIG. 6 is a diagram pertaining to the selection process of user profiles.

As previously described, assistance device 110 may select one or more user profiles that will most likely satisfy the user's need of assistance. FIG. 6 is a diagram pertaining to the selection process of user profiles. According to an exemplary embodiment, assistance device 110 may use information included in a help request (e.g., help request 140) to identify candidate user profiles that may be best suited to assist a user. For example, the help request includes the destination of the user. The help request may also include information pertaining to the type of assistance.

Based on the destination information or the destination and type of assistance information, according to an exemplary implementation, assistance device 110 may generate a search query to search for user profiles stored by user profile storage 115 via user profile storage manager 120. Assistance device 110 may receive, for example, a search result that includes a list of candidate user profiles. Assistance device 110 may then use a ranking algorithm to select the best possible candidate user profiles. According to some situations, when the destination location is remote, assistance device 110 may forego a scoring of and ranking of user profiles since there may be only one user profile.

According to an exemplary implementation, the ranking algorithm may score all or a portion of the user profiles included in the search result. For example, a score may be generated based on a weighting system. According to an exemplary implementation, the weighting system may be pre-configured in that a particular type of user profile information may be assigned a particular weighted value. According to other implementations, the weighting system may be dynamic and/or user-influenced based on user preferences and/or past user profile selections.

According to an exemplary embodiment, assistance device 110 may calculate a summation of each weight associated with each type of user profile information considered relevant. By way of example, the name of another user is not relevant nor his/her image. However, the time lived or worked in the location (e.g., field 420 of FIG. 4), the profession (e.g., field 425), and the user rating (e.g., field 455) may be particularly relevant. Additionally, some of the other types of user profile information may be impact the score of a user profile, such as age (e.g., field 450), user preferences (e.g., field 460), time driving (e.g., field 430), etc. According to an exemplary implementation, assistance device 110 may calculate a score S based on the following exemplary expression:

$$S = \sum_{i=1}^{n} w_i u_i, \quad (1)$$

in which i indicates the number of types of user profile information (e.g., i . . . n=1 . . . 5), w indicates the weight attributed to the type of user profile information, and u indicates the type of user profile information. Assistance device 110 may then rank the user profiles based on their scores.

Figure 7A:
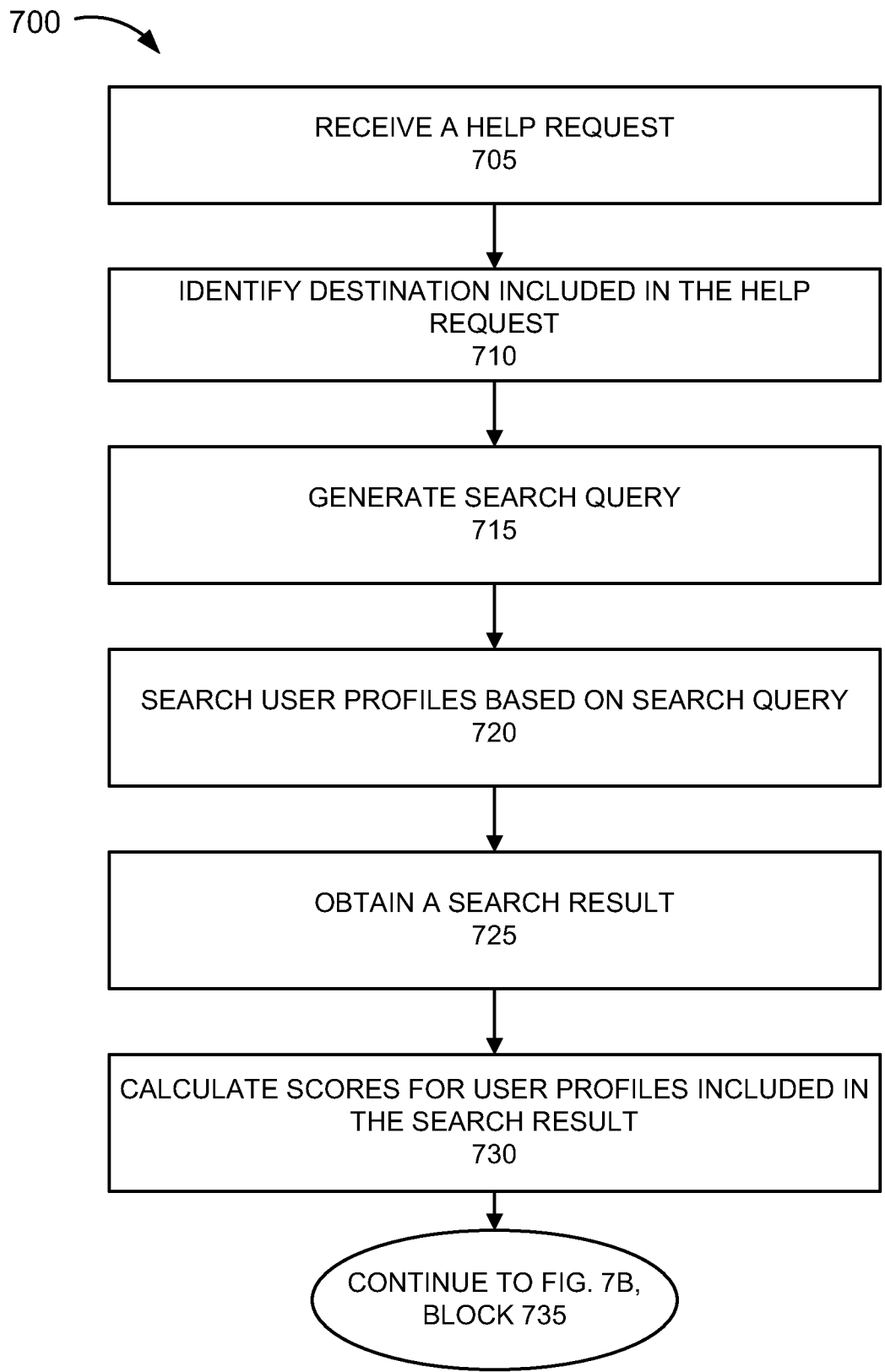
FIGS. 7A-7C are flow diagrams illustrating an exemplary process for providing user profile-based assistance.
Figure 7B:
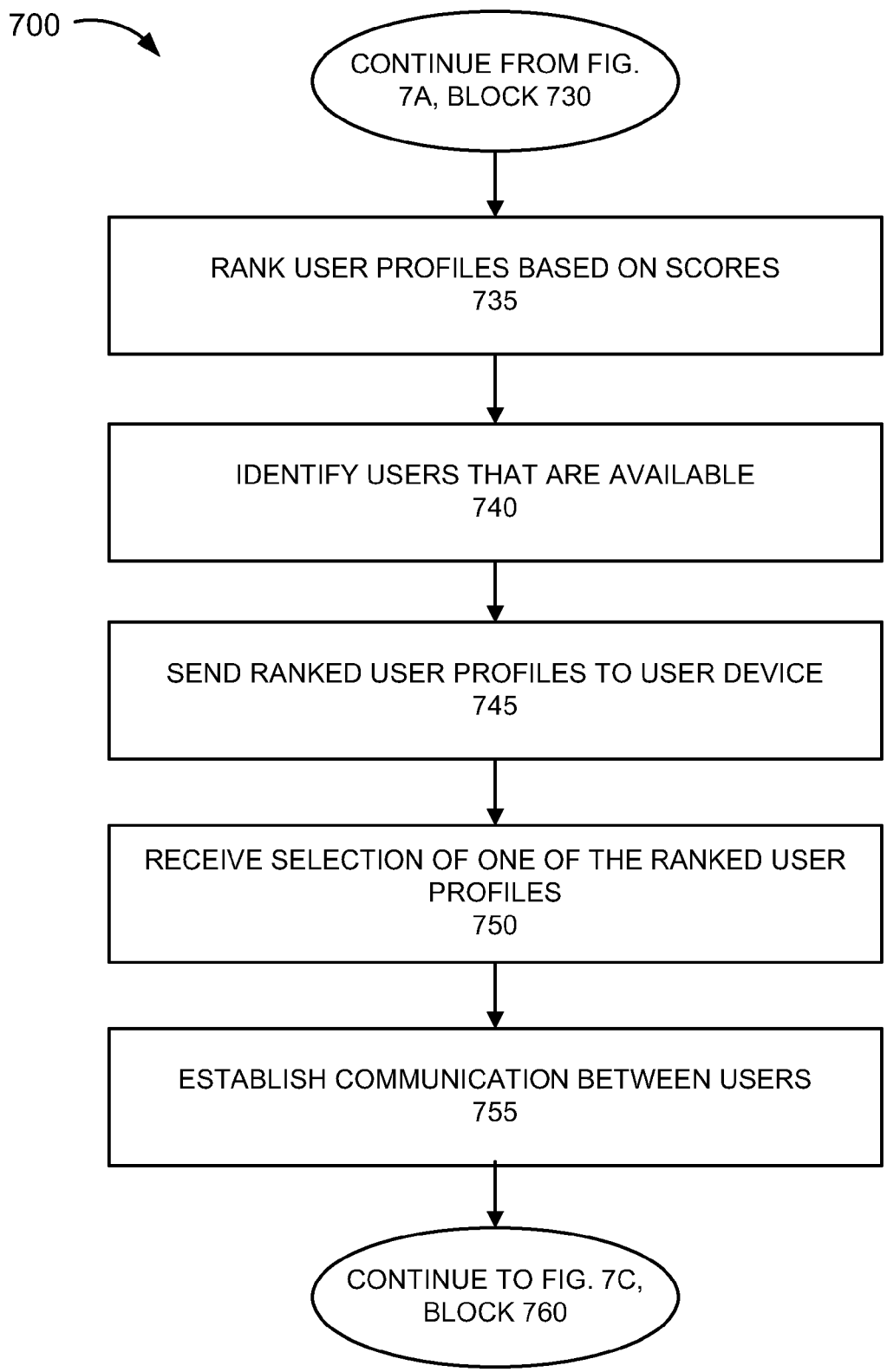
Figure 7C:
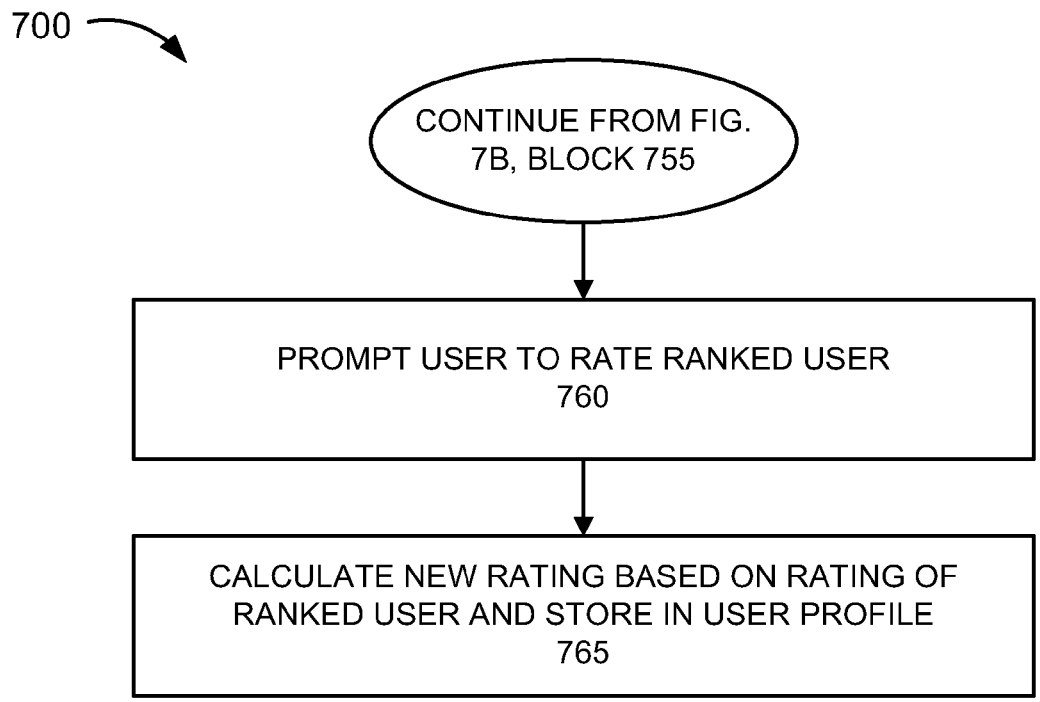

FIGS. 7A-7C are flow diagrams illustrating an exemplary process 700 for providing user profile-based assistance. According to an exemplary embodiment, some steps in process 700 are performed by assistance device 110. For example, processing system 205 executes application 215 (e.g., a help-assistance application or program). Additionally, some steps in process 700 are performed by user device 125. For example, processing system 205 executes a user profile-based assistance application or program.

In block 705, a help request is received. For example, assistance device 110 receives a help request (e.g., help request 125) via communication interface 220. The help request may take the form of a packet. The term "packet," as used herein, is intended to be broadly interpreted to include a data transmission or a communication, the packaging of which may correspond to, for example, a packet, a cell, a frame, a datagram, some other type of container or unit of data, and/or a fragment thereof.

In block 710, the destination included in the help request is identified. For example, assistance device 110 inspects the help request (e.g., field(s) of the packet) to identify a destination pertaining to the user's request for assistance. As previously described, according to other embodiments, the help request may include other information that may be useful in selecting best user profile candidates. For example, the help request may include an assistance category. The help request may also include information that identifies the user seeking assistance so that any user preferences are applied when selecting the best user profile candidates. For example, a user device identifier and/or a user identifier may be included in the help request. Alternatively, the help request may include user preference information. For example, the packet may include one or more user preference fields in which preferences, such as age, profession, etc., may be indicated.

In block 715, a search query is generated. For example, assistance device 110 generates a search query. For example, the search query may take the form of a Structured Query Language (SQL) search query. According to other implementations, the search query may take the form of other known database languages (e.g., Object Query Language (OQL), Java Persistence Query Language, Language Integrated Query (LINQ), etc.). The search query includes the destination of the user requesting assistance. Additionally, the search query may include other relevant parameters, such as the assistance category and/or user preferences of the user requesting assistance (e.g., age, profession, time driving, etc.).

In block 720, user profiles are searched based on the search query. For example, assistance device 110 searches user profile storage 115 via user profile storage manager 120. According to an exemplary embodiment, the database stored by user profile storage 115 may include an index pertaining to destination locations. Additionally, according to an exemplary embodiment, the database may include indexes pertaining to age and destination, or other combinations of attributes applicable to a user profile or a user preference. According to an exemplary implementation, the search query is received by user profile storage manager 120 from assistance device 110. The search is conducted and a search result is generated.

In block 725, a search result is obtained. For example, user profile storage manager 120 provides a search query response, which includes a search result, to assistance device 110.

In block 730, scores for each user profile included in the search result are calculated. For example, assistance device 110 may use a ranking algorithm to score each user profile and select the best user profile(s). The best user profiles are selected based on the scores. Thus, user profiles having scores higher than other user profiles may be selected as candidate user profiles. As previously described, user profiles are scored on a weighting system, such as is expressed according to equation (1). According to an exemplary implementation, the weighted value assigned to a particular type of user profile information is a numerical value, which may be static or dynamic. For example, a user preference may increase the value of a weight assigned to a particular type of user profile information. Additionally, for example, past selections of user profiles by a user may be statistically evaluated to generate a weighted value to be assigned to a type of user profile information representative of the user's user profile selection preference. For example, user profiles previously selected by the user may be compared to identify common attributes and a user preference. Alternatively, a weighted value assigned to a type of user profile information may be static and pre-configured by a network administrator.

Referring to FIG. 7B, in block 735, the user profiles are ranked based on the calculated scores. For example, assistance device 110 (e.g., the ranking algorithm) ranks the scored user profiles based on each score calculated for each user profile. According to an exemplary embodiment, user profiles are ranked based on a threshold score value. According to another embodiment, user profiles are ranked based on their respective scores. According to another exemplary embodiment, the number of user profiles selected and sent to the user (as described in block 735) may be limited by a particular number (e.g., no more than 20 user profiles, etc.). According to an exemplary implementation, assistance device 110 may select a candidate set of ranked user profiles and generate a user profile candidate list that includes the selected user profiles.

In block 740, the availability of the ranked users is identified. According to an exemplary embodiment, assistance device 110 identifies which of the ranked users are available. The availability of the ranked user refers to either the ranked user's user preference (e.g., user availability (e.g., user schedule), preferred form of communication, etc.) or whether the ranked user is active in the service provider network 105 (e.g., whether the ranked user's user device 125 is turned on (e.g., vehicular communication system is turned on (e.g., the ranked user is driving), a mobile device is turned on, etc.) and/or the ranked user is currently using a service (e.g., user profiled-based assistance service, mobile service, television service, Internet service.)), or both (i.e., ranked user availability based on user preferences and network active).

Assistance device 110 may identify ranked users' preferences and match these preferences with the help request. For example, a date, day, time, etc., restrictions indicated in a ranked user's preference (e.g., user schedule) may be identified, by assistance device 110, from the ranked user's profile and compared with the current date, day, time, etc. Additionally, or alternatively, assistance device 110 may identify whether a ranked user is network active. Depending on the services applied to the user profile-based communication assistance system, being able to identify the network activity of a ranked user may be more or less burdensome. For example, if assistance communication between users is limited to vehicular-based communication, assistance device 110 may be able to determine whether a ranked user is network active (e.g., the ranked user is also driving) because when a user profile-based assistance application or program is launched in the vehicular communication system, an initial service provider network 105-to-user device 125 handshaking occurs. For example, in a 4G wireless network (e.g., a Long Term Evolution (LTE) network), the mobility management entity (MME) or the packet gateway (PGW) may identify whether the ranked user is network active. In a similar manner, if assistance communication between users also includes mobile service, the MME or the PGW may identify whether a ranked user is network active. According to an exemplary implementation, assistance device 110 may be informed of a user's network activity state (e.g., during connection set-up). For example, assistance device 110 may include a network interface to communicate with the MME, the PGW, etc. Similarly, other types of wireless networks (e.g., Code Division Multiple Access (CDMA), Global System for Mobile Communications (GSM), etc.) may include network devices (e.g., Mobile Switching Center (MSC), a Home Agent (HA), Packet Data Service Node (PDSN), etc.) that can identify whether users are network active. Additionally, according to an exemplary implementation, if a VoIP network is used (e.g., relative to a vehicular communication system or mobile service), a Session Initiation Protocol (SIP) server or a call agent device, may inform assistance device 110 that a ranked user is network active.

According to an exemplary embodiment, assistance communication between users may also include communication via television service. For example, a television distribution site (TDS) that services a user may identify when a set top box or other SPN television service interface device is being used. For example, a search server of the TDS site that services requests for content from a user via the set top box may identify a ranked user's network activity. The search server may inform assistance device 110 that a ranked user is network active.

According to an exemplary implementation, if a ranked user is not available, assistance device 110 selects another ranked user. Otherwise, if the ranked users are available, process 700 continues to block 745.

In block 745, the ranked user profiles are sent to user device 125. For example, assistance device 110 may send the ranked user profiles, which have been selected, to user device 125 via communication interface 220. According to an exemplary embodiment, the ranked user profiles include embedded contact information for each ranked user. The contact information may take the form of, for example, an Internet Protocol (IP) address and/or Media Access Control (MAC) address, a telephone number, an email address, and/or other contact address.

In block 750, a selection of one of the ranked user profiles is received. For example, user device 125 receives a selection of one of the ranked user profiles and generates a connection request. The connection request includes the ranked user's contact information. User device 125 sends the connection request to the ranked user via service provider network 105. The form of the communication may include, for example, a VoIP call or a video telephone call (e.g., when user devices 125 are vehicular communication systems), a wireless telephone call (e.g., when user devices 125 are mobile devices), a telephone call (e.g., a mobile device to a landline phone), an email message, a text message, etc.

In block 755, the ranked user receives the connection request via user device 125. According to this example, it may be assumed that the ranked user accepts the connection request and a communication session between the user seeking assistance and the ranked user is established. As previously described, according to an exemplary implementation, the user seeking assistance may send his/her location to the ranked user. In the event that the ranked user does not accept the connection request, the user may select another ranked user. Alternatively, the user may select multiple ranked users to initiate a communication session.

Referring to FIG. 7C, in block 760, the user seeking assistance is prompted to rate the ranked user. For example, user device 125 may prompt the user to rate the ranked user when the communication has terminated. The user may rate the user vocally (e.g., via voice command) or via a GUI provided. The user may send the rating to assistance device 110 via user device 125.

In block 765, assistance device 110 may receive the user's rating and update the rating of the ranked user based on the user's rating. For example, if the ranked user's rating is 8 out of 10, and the user rates the ranked user as a 10, assistance device 110 recalculates the ranked user's rating. According to this example, the ranked user's rating increases in value. Assistance device 110 stores the updated ranking value in user profile storage 115 via user profile storage manager 120. For example, assistance device 110 generates an update data request to user profile storage manager 120.

Although FIGS. 7A-7C illustrate an exemplary process 700 for providing user profile-based assistance, according to other embodiments, process 700 may include additional operations, fewer operations, and/or different operations than those illustrated in FIGS. 7A-7C and described. For example, according to other embodiments, block 740 may be performed when the search results are obtained (e.g., at block 725), when scores are calculated (e.g., at block 730), or when user profiles are ranked (e.g., at block 735). According to yet another embodiment, block 740 may be omitted.

Figure 8A:
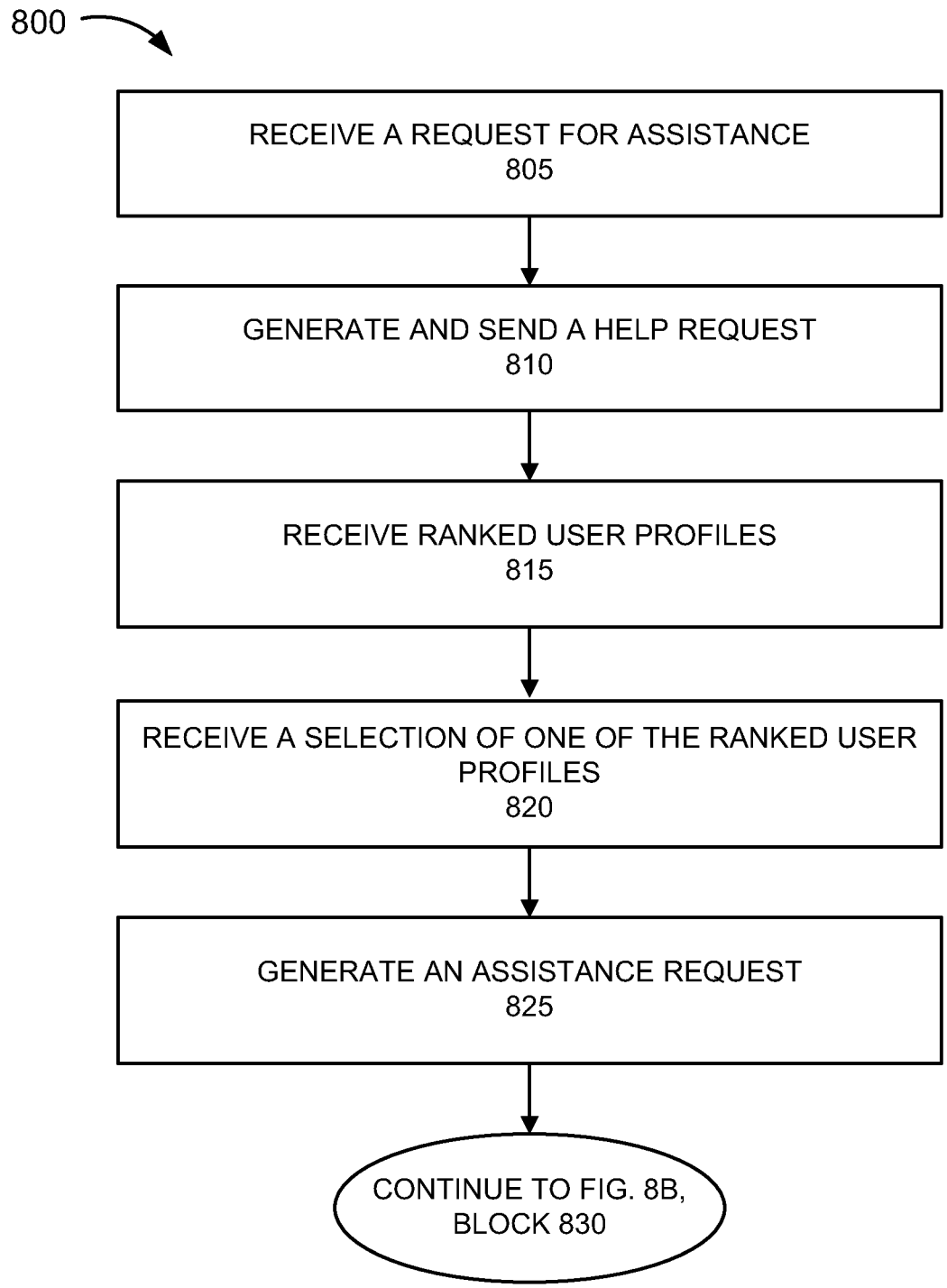
FIGS. 8A and 8B are flow diagrams illustrating another exemplary process for providing user profile-based assistance.
Figure 8B:
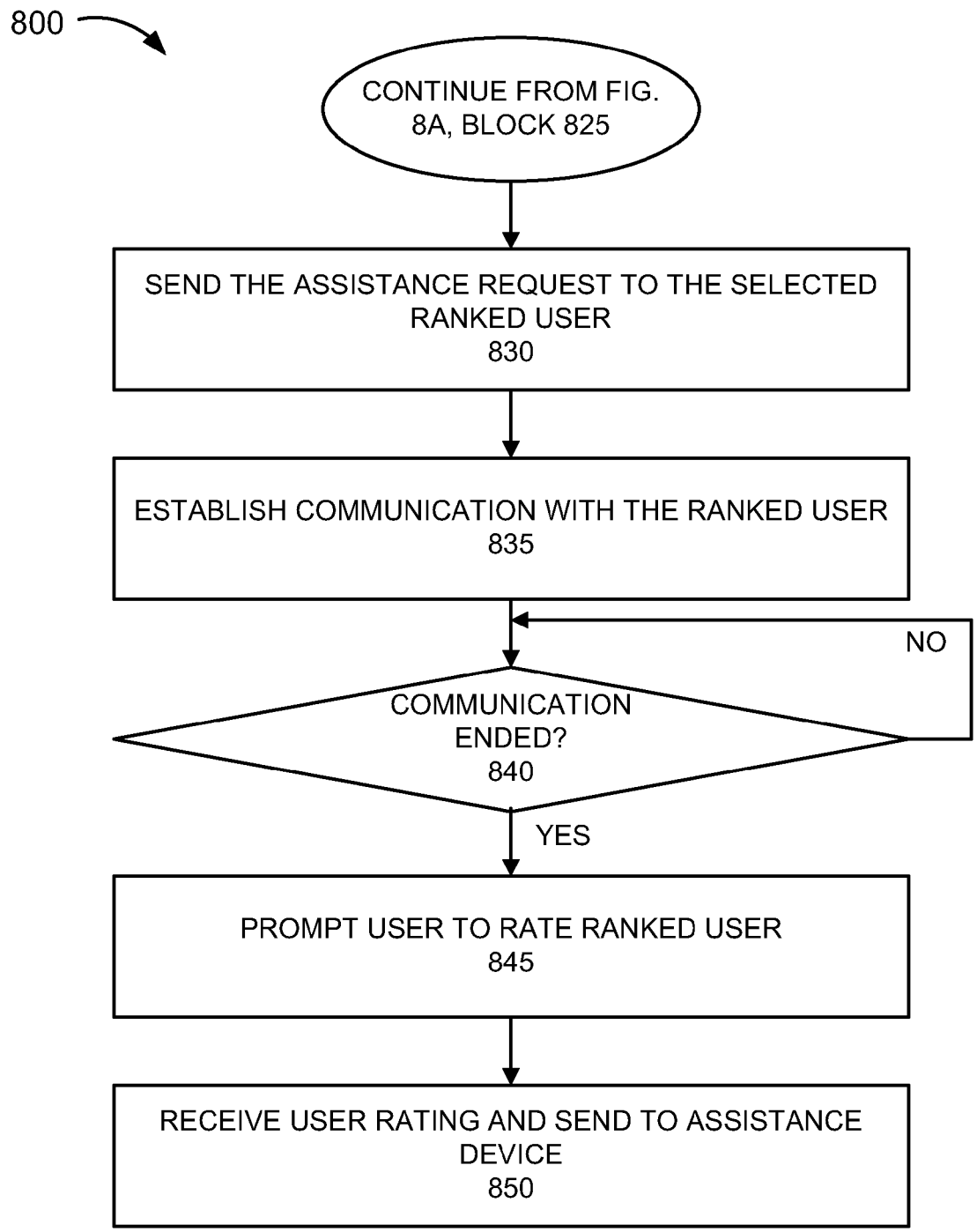

FIGS. 8A and 8B are flow diagrams illustrating another exemplary process for providing user profile-based assistance. According to an exemplary embodiment, process 800 is performed by user device 125. For example, processing system 205 executes a user profile-based assistance application or program.

According to an exemplary embodiment, process 800 may be performed by a user device 125, such as a vehicular communication system. For example, the vehicular communication system may include a computer having a display (e.g., a touch screen) and location-aware capability, as previously described. According to other embodiments, user device 125 may take the form of a mobile device, etc., as previously described.

The user profile-based assistance application or program may provide a user with various graphical user interfaces pertaining to the initial set up of a user profile and the use of the user profile-based assistance service. According to an exemplary implementation, the user-profile-based assistance application or program may include a client-based application or program. According to another implementation, the user profile-based assistance application or program may include a peer-to-peer application or program. According to an exemplary embodiment, the user profile-based assistance service may be directed to road assistance. Additionally, or alternatively, according to other embodiments, the user profile-based assistance service may pertain to other types of assistance, as previously described.

Referring to FIG. 8A, in block 805, user device 125 receives a request for assistance. For example, the user may ask for help (e.g., vocally) or the user may input his/her request some other way (e.g., touching an icon displayed on a touch display, pressing a key, etc.).

In block 810, user device 125 generates a help request and sends the help request to assistance device 120. For example, user device 125 may generate the help request, which may take the form of a packet. User device 125 may prompt the user seeking assistance to provide the destination. Alternatively, user device 125 may identify the user's current location as the destination based on a user's confirmation. Depending on the circumstances, however, the user's current location may or may not correspond to the destination. For example, a user may request assistance before reaching his or her destination. User device 125 may also acquire other information from the user, such as the type of assistance needed (e.g., road assistance, monetary assistance, etc.). User device 125 may also prompt the user for other user preferences (e.g., age, profession, etc.). Alternatively, the user preferences of the user may be obtained by assistance device 110.

The help request includes the user's destination. Additionally, the help request may include the type of assistance needed and/or user preferences. User device 125 sends the help request to assistance device 110 via service provider network 105.

In block 815, in response to the help request, user device 125 receives a ranked list of candidate user profiles. User device 125 displays the ranked list via a display. The user may choose to review the user profiles on the display. Alternatively, the user may request that the user-profile-based assistance application or program (e.g., including speech synthesis logic) vocalize (e.g., synthesize speech) the user profile information to the user. This may be helpful if the user is driving. The user may be able to set preferences to which fields in the user profile the user wishes to hear (e.g., just name and years lived and/or worked in location, or name, years lived and/or worked in location, and profession, etc.).

In block 820, user device 125 receives a selection of one of the ranked user profiles, and in block 825, generates an assistance request. The assistance request may take the form of a packet and includes the ranked user's contact information. The form of communication (e.g., a VoIP call, a video telephone call, etc.) may be selected by the user. Referring to FIG. 8B, in block 830, user device 125 sends the assistance request to the ranked user via service provider network 105.

In block 835, as previously described, the ranked user has the option to accept or deny (e.g., ignore) the assistance request. For purposes of description, it may be assumed the ranked user accepts the assistance request and user device 125 of the ranked user generates an assistance response, which may take the form of a packet, and sends the assistance response to user device 125 of the user seeking assistance, via service provider network 105. Thereafter, a communication session may be established.

In block 840, user device 125 determines whether the communication session ends. For example, user device 125 determines when the communication between the user and the rank user ends based on communication interface 220 (e.g., when a disconnect message is sent or received). If it is determined that the communication has not ended (block 840— NO), process 800 continues to wait (i.e., at block 840). If it is determined that the communication has ended (block 840— YES), process 800 continues to block 845.

In block 845, the user seeking assistance is prompted to rate the ranked user. For example, user device 125 prompts the user to rate the ranked user when the communication is terminated. The user may rate the user vocally (e.g., via voice command) or via a GUI provided.

In block 850, user device 125 receives the user's rating of the ranked user. User device 125 generates a rating message, which may take the form of a packet, and sends the rating message to assistance device 110. The rating message includes the rating of the ranked user and an identifier of the ranked user.

Although FIGS. 8A and 8B illustrate an exemplary process 800 for providing user profile-based assistance, according to other embodiments, process 800 may include additional operations, fewer operations, and/or different operations than those illustrated in FIGS. 8A and 8B and described.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/ or" is intended to be interpreted to include any and all combinations of one or more of the associated items. The phrase "tangible readable medium" is intended to be broadly interpreted to include the storage mediums described in relation to memory/storage 210.

In addition, while series of blocks have been described with regard to the processes illustrated in FIGS. 7A-7C and FIGS. 8A and 8B, the order of the blocks may be modified according to other embodiments. Further, non-dependent blocks may be performed in parallel. Additionally, other processes described in this description may be modified and/or non-dependent operations may be performed in parallel.

An embodiment described herein may be implemented in many different forms of hardware and, software and/or firmware. For example, a process or a function may be implemented as "logic" or as a "component." The logic or the component may include hardware (e.g., processing system 205, etc.), a combination of hardware and software (e.g., application 215), a combination of hardware and firmware, or a combination of hardware, firmware, and software. An embodiment has been described without reference to the specific software code since the software can be designed to implement the embodiment based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising: storing, by a processor, user profiles corresponding to first users, wherein the user profiles include biographical information identifying respective first locations and respective first topics associated with the first users; receiving, by the processor, an assistance request from a second user, wherein the assistance request is related to a second topic and a second geographic location; scoring, by the processor, the user profiles with respect to the assistance request, wherein scoring the user profiles, includes: comparing the respective first geographic locations and the second geographic location to produce first comparison results, wherein the first comparison results identify respective geographic distances between the respective first geographic locations and the second geographic location, comparing the respective first topics and the second topic to produce second comparison results, and calculating scores for the user profiles based on the first comparison results and the second comparison results, each of the scores indicating a likelihood that a respective one of the first users can correctly answer the assistance request, wherein calculating the scores includes summing, for each of the user profiles, a first weighted value associated with a corresponding one of the respective geographic distances, a second weighted value associated with a corresponding one of the second comparison results, and varying weighted values associated with each of the user profiles; selecting, by the processor and based on the scores, one or more candidate user profiles of the user profiles; sending, by the processor, information associated with the one or more candidate user profiles to the second user; receiving, by the processor and based on sending the information associated with the one or more candidate user profiles, a selection of a particular user profile of the one or more candidate user profiles, wherein the particular user profile is associated with a particular first user of the first users; and establishing, by the processor, a personal assistance communication session between the particular first user and the second user after identifying whether the first user is network active; wherein the user profiles include information pertaining to user's time availability, choice of communication, and at least one of level of education or category of expertise.

2. The method of claim 1, wherein a user profile, of the user profiles, includes information indicating one or more of:
   a profession of a corresponding first user associated with the user profile,
   a name of the corresponding first user,
   a length of time in which the corresponding first user has at least one of driven, lived, or worked in proximity to the respective first geographic location associated with the user profile, or
   a user rating associated with the corresponding first user, wherein the user rating is based on ratings associated with responses provided by the corresponding first user to other assistance requests.

3. The method of claim 1, further comprising:
   ranking the user profiles based on the scores,
   wherein selecting the one or more candidate user profiles comprises:
      selecting, as the one or more candidate user profiles, a highest ranked one or more of the user profiles.

4. The method of claim 2, wherein calculating the score for the user profile further comprises:
   summing two or more of:
      a third weighted value associated with a comparison of the second topic to a profession of the corresponding first user;
      a fourth weighted value associated with the length of time; or
      a fifth weighted value associated with the user rating.

5. The method of claim 1, further comprising:
   receiving, from the second user, feedback regarding the particular first user after the communication session is terminated; and
   updating the particular user profile based on the feedback.

6. The method of claim 1, wherein:
   the assistance request pertains to driving assistance associated with the second geographic location,
   the respective first geographic locations relate to areas driven by the first users, and
   the information associated with the one or more candidate user profiles, that is sent to the second user, includes one or more first geographic locations, of the respective first geographic locations corresponding to the one or more candidate user profiles.

7. The method of claim 1, further comprising:
   recording a conversation between the particular first user and the second user during the communication session;
   storing the recorded conversation; and
   providing the recorded conversation after termination of the communication session.

8. A device comprising: one or more memories to store user profiles corresponding to first users, wherein the user profiles include biographical information identifying respective first geographic locations and respective first topics associated with the first users; and one or more processing systems to: receive an assistance request from a second user, wherein the assistance request is related to a second topic and a second geographic location, score the user profiles with respect to the assistance request, wherein the one or more processing systems, when scoring the user profiles, are further to: compare the respective first geographic locations to the second geographic location and the respective first topics to the second topic to produce comparison results, wherein the comparison results identify respective geographic distances between the respective first geographic locations and the second geographic location, determine, based on the comparison results, respective likelihoods that the first users can correctly answer the assistance request, and calculate scores for the user profiles based on the respective likelihoods, wherein calculating the scores includes summing, first weighted values associated with respective geographic distances between the first geographic locations and the second geographic location, second weighted values associated with respective knowledge of the plurality of first users with respect to the topic, and varying weighted values associated with each of the user profiles, select, from the user profiles, one or more candidate user profiles based on the scores, and send information associated with the one or more candidate user profiles to the second user; and establish a personal assistance communication session between a first communication device, associated with one or more of the first users, and a second communication device associated with a second user after identifying whether one of the one or more first users is network active; wherein the user profiles include information pertaining to user's time availability, choice of communication, and at least one of level of education or category of expertise.

9. The device of claim 8, wherein the biographical information further identifies respective preferences associated with the first users regarding when the first users can be contacted, and
wherein the one or more processing systems, when selecting the one or more candidate user profiles, are further to:
determine respective recent actions associated with the first users,
identify a subset of the user profiles associated with ones of the first user who are available to respond to the assistance request, wherein the one or more processing systems identify the subset based on the preferences, a time when the assistance request is received, and the recent actions, and
select the one or more candidate user profiles from the subset.

10. The device of claim 8, wherein a user profile, of the user profiles includes information indicating one or more of:
a profession of a corresponding first user associated with the user profile,
a name of the corresponding first user,
a length of time in which the corresponding first user has at least one of driven, lived, or worked in proximity to the respective first geographic location associated with the user profile, or
a user rating associated with the corresponding first user, wherein the user rating is based on ratings associated with responses provided by the corresponding first user to other assistance requests.

11. The device of claim 8, wherein the one or more processing systems, when selecting the one or more candidate profiles, are further to:
rank the user profiles based on the scores, and
select the one or more candidate user profiles based on ranking the user profiles.

12. The device of claim 10, wherein the one or more processing systems, when calculating the score for the user profile, are further to:
sum two or more of:
a first weighted value associated with a comparison of the second topic to a profession of the corresponding first user;
a second weighted value associated with the length of time; or
a third weighted value associated with the user rating.

13. A method comprising: receiving, by a processor, a request from a first user, the request identifying a topic related to a first geographic location; identifying, by the processor, one or more second users of a plurality of second users, wherein identifying the one or more second users includes: determining respective biographical information associated with the plurality of second users, and using the respective biographical information to score the plurality of second users with respect to the first geographic location and the topic to produce scores, wherein using the respective biographical information includes: identifying respective geographic distances between the first geographic location and respective second geographic locations associated with the plurality of second users, summing first weighted values associated with the respective geographic distances, second weighted values associated with the respective knowledge of the plurality of second users in the topic, and varying weighted values associated with each user profiles, the scores indicating respective likelihoods that the plurality of second users can correctly respond to the request, and the one or more second users being associated with, respectively, one or more of the scores that satisfy a threshold value; and initiating, by the processor, a personal assistance communication session between a first communication device, associated with the first user, and a second communication device associated with one of the one or more second users after identifying whether one of the one or more second users is network active; wherein the user profiles include information pertaining to user's time availability, choice of communication, and at least one of level of education or category of expertise.

14. The method of claim 13, wherein identifying the one or more second users further includes:
receiving feedback regarding assistance provided by the plurality of second users to other requests; and
scoring the plurality of second users further based on the feedback.

15. The method of claim 13, wherein:
the communication session is a vehicle-to-vehicle communication session, and
the request relates to vehicular road assistance.

16. The method of claim 13, wherein the biographical information associated with a second user, of the plurality of second users, includes information indicating:
a profession of the second user,
a name of the second user,
a length of time the second user is associated with a corresponding second geographic location, and
a rating associated with responses provided by the second user to one or more other requests.

17. A device comprising: one or more memories; and one or more processing systems to: receive a request from a first user, the request identifying a topic related to a first geographic location, determine respective biographical information associated with a plurality of second users, use the respective biographical information to score the plurality of second users with respect to the first geographic location and the topic to produce scores, the scores indicating respective likelihoods that the plurality of second users can correctly respond to the request, and the one or more processing systems, when using the respective biographical information, being further configured to: identify respective second geographic locations associated with the plurality of second users, and sum first weighted values associated with respective geographic distances between the first geographic location and the second geographic locations, second weighted values associated with respective knowledge of the plurality of second users with respect to the topic, and varying weighted values associated with each user profiles, identify one or more second users, of the plurality of second users, associated with, respectively, one or more of the scores that satisfy a threshold value, and establish a personal assistance communication session between a first communication device, associated with the first user, and a second communication device associated with one of the one or more second users after identifying whether one of the one or more second users is network active; wherein the user profiles include information pertaining to user's time availability, choice of communication, and at least one of level of education or category of expertise.

18. The device of claim 17, wherein the biographical information associated with a second user, of the plurality of second users, includes information indicating:
    a profession of the second user,
    a name of the second user,
    a length of time the second user is associated with a corresponding second geographic location, and
    a rating associated with responses provided by the second user to one or more other requests.

19. The device of claim 17, wherein the one or more processing systems, when receiving the request, are further to:
    receive an audio message from the first user, and
    perform speech recognition on the audio message to recognize the first geographic location and the topic.

20. The device of claim 17, wherein the topic pertains to at least one of restaurants or shopping associated with the first geographic location.

21. The device of claim 17, wherein the request further includes information associated with a preference pertaining to at least one of a profession or an age, and
    wherein the one or more processing systems, when using the respective biographical information to score the plurality of second users, are further to:
        score the plurality of second users further based on the preference.

22. A non-transitory computer-readable medium storing instructions, the instructions comprising: one or more instructions that, when executed by a computational device, cause the computational device to: receive a request from a first user, the request identifying a topic related to a first geographic location, determine respective biographical information associated with a plurality of second users, wherein determining the respective biographical information includes identifying respective second geographic locations associated with the plurality of second users, score, based on the biographical information, the plurality of second users with respect to the first geographic location and the topic to produce scores, the scores corresponding to respective likelihoods that the plurality of second users can correctly respond to the request, and wherein the scores includes sums of: first weighted values associated with respective geographic distances between the first geographic location and the second geographic locations, second weighted values associated with respective experiences of the plurality of second users in the topic, and varying weighted values associated with each user profiles, identify one or more second users, of the plurality of second users, associated with, respectively, one or more of the scores that satisfy a threshold value, receive, from the first user, a selection of a particular second user of the one or more second users, and establish, based on the selection, a personal assistance communication session between a device associated with the first user and a device associated with the particular second user after identifying whether one of the one or more second users is network active; wherein the user profiles include information pertaining to user's time availability, choice of communication, and at least one of level of education or category of expertise.

23. The non-transitory computer-readable medium of claim 22, wherein the request is received from a first user device associated with the first user, and
    wherein the one or more instructions to establish the communication session further include:
        one or more instructions to:
            identify, based on the request, a second user device associated with the first user, wherein the first user device and the second user device differ, and
            establish the communication session between the second user device and the device associated with the particular second user.

24. The non-transitory computer-readable medium of claim 22, wherein the instructions further comprise:
    one or more instructions to:
        rank the plurality of second users based on the scores,
        identify a quantity of highest ranking second users from the plurality of second users, and
        determine the threshold value based on ones of the scores associated with the quantity of the highest ranking second users.

* * * * *